United States Patent
Wang

(10) Patent No.: US 11,429,222 B2
(45) Date of Patent: Aug. 30, 2022

(54) CONTROL CIRCUIT AND DISPLAY APPARATUS UTILIZING THE SAME

(71) Applicant: Nuvoton Technology Corporation, Hsinchu (TW)

(72) Inventor: Cheng-Chih Wang, Jhubei (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/200,360

(22) Filed: Mar. 12, 2021

(65) Prior Publication Data

US 2021/0200410 A1 Jul. 1, 2021

Related U.S. Application Data

(63) Continuation-in-part of application No. 16/728,667, filed on Dec. 27, 2019, now Pat. No. 10,976,874.

(30) Foreign Application Priority Data

Oct. 25, 2019 (TW) .................................. 108138533

(51) Int. Cl.
*G06F 3/045* (2006.01)
*G06F 3/041* (2006.01)
(Continued)

(52) U.S. Cl.
CPC .......... *G06F 3/04164* (2019.05); *G06F 3/044* (2013.01); *G09G 3/3216* (2013.01)

(58) Field of Classification Search
CPC ................... H02M 1/08; H02M 1/088; H02M 2001/0009; H02M 2001/0045; H02M 2001/0048; H02M 3/158
See application file for complete search history.

(56) References Cited

U.S. PATENT DOCUMENTS 9,176,629 B2 11/2015 Chen et al.
2015/0062062 A1 3/2015 Han et al.
(Continued)

FOREIGN PATENT DOCUMENTS

CN 107957809 A 4/2018
CN 108228006 A 6/2018
TW 201809989 A 3/2018

OTHER PUBLICATIONS

Office Action issued in corresponding TW application No. 108138533 dated May 20, 2020 (with Search Report attached thereto) (6 pages).
(Continued)

*Primary Examiner* — Insa Sadio
(74) *Attorney, Agent, or Firm* — Muncy, Geissler, Olds & Lowe, P.C.

(57) ABSTRACT

A control circuit is provided. A first input-output pin is coupled to a display device and a capacitive touch device. A second input-output pin is coupled to the display device and a capacitive touch device. A sensing circuit determines whether the capacitive touch device is touched according to the voltages of the first and second input-output pins. A display controller provides a first driving signal to the display device via the first input-output pin and provides a second driving signal to the display device via the second input-output pin in a first display period and a second display period. From the end time point of the first display period to the start time point of the second display period, the sensing circuit detects the voltage level of the first input-output pin and stops detecting the voltage of the second input-output pin.

20 Claims, 16 Drawing Sheets

(51) Int. Cl.
　　　*G09G 3/3216*　　　(2016.01)
　　　*G06F 3/044*　　　(2006.01)

(56) References Cited

U.S. PATENT DOCUMENTS

2017/0192563 A1* 7/2017 Liao ..................... G06F 3/0443
2018/0107317 A1　 4/2018 Tanaka et al.
2018/0284928 A1* 10/2018 Kremin ............... G06F 3/04166

OTHER PUBLICATIONS

Office Action dated Mar. 3, 2022 in TW Application No. 110114633, 3 pages.
U.S. Appl. No. 17/200,326, filed Mar. 12, 2021.

* cited by examiner

CONTROL CIRCUIT AND DISPLAY APPARATUS UTILIZING THE SAME

CROSS REFERENCE TO RELATED APPLICATIONS

This application is a Continuation-In-Part of pending U.S. patent application Ser. No. 16/728,667, filed Dec. 27, 2019 and entitled "control circuit and operating system utilizing the same", and priority of Taiwan Patent Application No. 108138533, filed on Oct. 25, 2019, which are hereby incorporated by reference in their entirety.

BACKGROUND OF THE INVENTION

Field of the Invention

The invention relates to a control circuit, and more particularly to a control circuit that is coupled to a display device and a touch device.

Description of the Related Art

With technological development, the types and functions of electronic devices have increased. Generally, each electronic device has at least one input device and at least one output device. A control device in a corresponding electronic device controls the operation of the electronic device according to the information received by the input device. The control device displays the corresponding image via the output device. The touch device is a common input device. The display device is a common output device. However, since the touch device and the display device have more input-output pins, the number of pins in the control device must be greater than the sum of the number of input-output pins in the touch device and the display device so that the control device can be coupled to the touch device and the display device. Therefore, the space in the electronic device is reduced.

BRIEF SUMMARY OF THE INVENTION

In accordance with an embodiment of the disclosure, a control circuit comprises a first input-output pin, a second input-output pin, a sensing circuit, and a display controller. The first input-output pin is configured to be coupled to a first input pin of a display device and a first sensing pin of a capacitive touch device. The second input-output pin is configured to be coupled to a second input pin of the display device and a second sensing pin of the capacitive touch device. The sensing circuit determines whether the capacitive touch device is touched based on the voltage of the first input-output pin and the voltage of the second input-output pin. The display controller provides a first driving signal to the display device via the first input-output pin and provides a second driving signal to the display device via the second input-output pin in a first display period and a second display period. After the end time point of the first display period, the display controller stops providing the first and second driving signals. After the start time point of the second display period, the display controller provides the first and second driving signals. From the end time point of the first display period to the start time point of the second display period, the sensing circuit detects the voltage level of the first input-output pin and stops detecting the voltage of the second input-output pin.

In accordance with another embodiment of the disclosure, a display apparatus comprises a display device, a capacitive touch device, and a control circuit. The display device comprises a first input pin and a second input pin. The capacitive touch device comprises a first sensing pin and a second sensing pin. The control circuit comprises a first input-output pin, a second input-output pin, a sensing circuit, and a display controller. The first input-output pin is configured to be coupled to the first input pin and the first sensing pin. The second input-output pin is configured to be coupled to the second input pin and the second sensing pin. The sensing circuit determines whether the capacitive touch device is touched based on the voltage of the first input-output pin and the voltage of the second input-output pin. The display controller provides a first driving signal to the display device via the first input-output pin and provides a second driving signal to the display device via the second input-output pin in a first display period and a second display period. The display device displays images according to the first and second driving signals in the first and second display periods. After the end time point of the first display period, the display controller stops providing the first and second driving signals. After the start time point of the second display period, the display controller provides the first and second driving signals. From the end time point of the first display period to the start time point of the second display period, the sensing circuit detects the voltage level of the first input-output pin and stops detecting the voltage of the second input-output pin.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
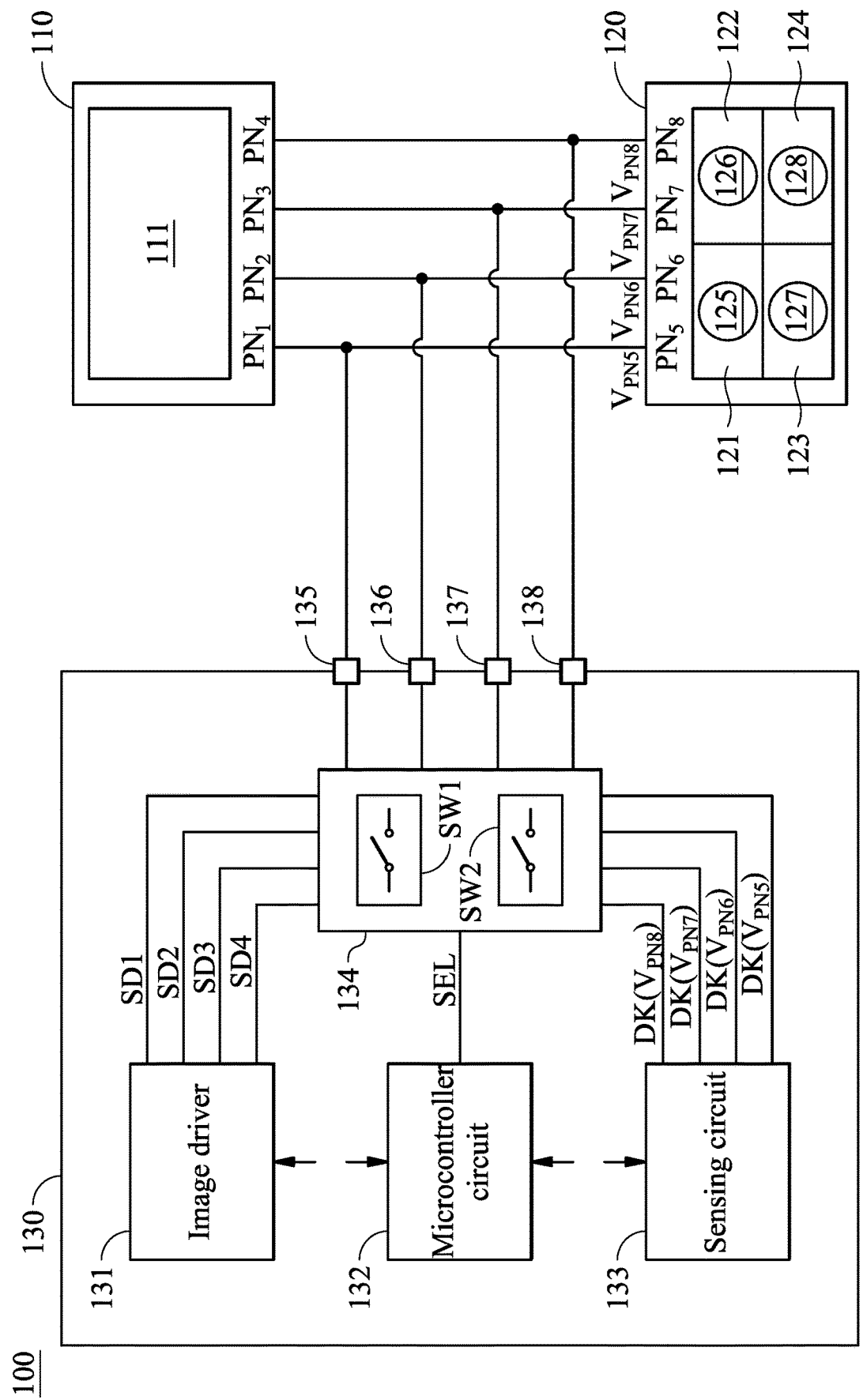
FIG. 1 is a schematic diagram of an exemplary embodiment of an operating system, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operating system, according to various aspects of the present disclosure. As shown in FIG. 1, the operating system 100 comprises a display device 110, a capacitive touch device 120 and a control circuit 130. The display device 110 comprises pins $PN_1 \sim PN_4$ and a display area 111. The display area 111 displays an image according to the voltage levels of the pins $PN_1 \sim PN_4$. The number of pins of the display device 110 is not limited in the present disclosure. Additionally, the invention is not limited to the kind of display device 110. In one embodiment, the display device 110 is a super twisted liquid-crystal display (STN LCD) panel.

The capacitive touch device 120 comprises areas 121~124, sensing elements 125~128 and pins $PN_5 \sim PN_8$, but the disclosure is not limited thereto. In other embodiment, the capacitive touch device 120 may comprise more or fewer areas, sensing elements and pins. The invention is not limited to the kind of capacitive touch device 120. In one embodiment, the capacitive touch device 120 is a touch keyboard or a touch pad.

In this embodiment, the sensing element 125 is disposed in the area 121 to determine whether the area 121 is touched, the sensing element 126 is disposed in the area 122 to determine whether the area 122 is touched, the sensing element 126 is disposed in the area 123 to determine whether the area 123 is touched, and the sensing element 128 is disposed in the area 124 to determine whether the area 124 is touched. In one embodiment, the sensing elements 125~128 are capacitive sensors. The pin $PN_5$ outputs the sensing result generated by the sensing element 125. The pin $PN_6$ outputs the sensing result generated by the sensing element 126. The pin $PN_7$ outputs the sensing result generated by the sensing element 127. The pin $PN_8$ outputs the sensing result generated by the sensing element 128. Taking the sensing element 125 as an example, when the area 121 is not touched, the capacitance of the sensing element 125 is not changed. Therefore, the voltage $V_{PN5}$ of the pin $PN_5$ is equal to a reference voltage. However, when the area 121 is touched, the capacitance of the sensing element 125 is changed (e.g., increase). Therefore, voltage $V_{PN5}$ of the pin $PN_5$ is not equal to the reference voltage, for example, the voltage $V_{PN5}$ of the pin $PN_5$ may be less than the reference voltage.

The control circuit 130 comprises an image driver 131, a microcontroller circuit 132, a sensing circuit 133, a transmission circuit 134 and an input-output pins 135~138. The image driver 131 is configured to drive the display device 110. In this embodiment, the image driver 131 generates driving signals SD1~SD4, but the disclosure is not limited thereto. In other embodiments, the image driver 131 may generate more or fewer driving signals. The structure of the image driver 131 is not limited in the present disclosure. In one embodiment, the image driver 131 is a LCD driver. In another embodiment, the image driver 131 is a COM/SEG driver to generate COM/SEG wave.

The sensing circuit 133 is configured to determine whether the capacitive touch device 120 is touched and the touched position. The invention does not limit how the sensing circuit 133 determines whether the capacitive touch device 120 is touched. In one embodiment, the sensing circuit 133 first provides a reference voltage DK to the pins $PN_5 \sim PN_8$ of the capacitive ouch device 120 and then detects whether the voltage levels of the pins $PN_5 \sim PN_8$ are changed. When one voltage level is changed, it means that the corresponding area is touched. For example, when the voltage $V_{PN5}$ of the pin $PN_5$ is not equal to the reference voltage DK, it means that the area 121 corresponding to the pin $PN_5$ is touched. On the contrary, when the voltage $V_{PN5}$ of the pin $PN_5$ is equal to the reference voltage DK, it means that the area 121 corresponding to the pin $PN_5$ is not touched. In other embodiments, the reference voltage DK is less than 1V.

The transmission circuit 134 comprises switching circuits SW1 and SW2. The switching circuit SW1 is coupled between the image driver 131 and the input-output pins 135~138 and controlled by a switching signal SEL. When the switching signal SEL turns on the switching circuit SW1, the switching circuit SW1 transmits the driving signals SD1~SD4 to the input-output pins 135~138. At this time, the input-output pins 135~138 serve as output pins to output the driving signals SD1~SD4 to the display device 110.

The switching circuit SW2 is coupled between the sensing circuit 133 and the input-output pins 135~138 and controlled by the switching signal SEL. When the switching signal SEL turns on the switching circuit SW2, the switching circuit SW2 may transmit the reference voltage DK to the input-output pins 135~138 and then transmit the voltages $V_{PN5} \sim V_{PN8}$ of the pins $PN_5 \sim PN_8$ to the sensing circuit 133.

In this embodiment, the input-output pins 135~138 are configured to transmit analog signals. In other words, the driving signals SD1~SD4 and the voltages $V_{PN5} \sim V_{PN8}$ are analog signals. Additionally, in the embodiment, the display device 110 and the capacitive touch device 120 share the input-output pins 135~138. Therefore, the number of input-output pins of the control circuit 130 can be reduced. In other embodiments, the display device 110 and the capacitive touch device 120 share more or fewer input-output pins.

Since the features of the input-output pins 135~138 are the same, the input-output pin 135 is given as an example. As shown in FIG. 1, the input-output pin 135 is coupled to the pin $PN_1$ of the display device 110 and the pin $PN_5$ of the capacitive touch device 120. When the switching circuit SW1 is turned on, the input-output pin 135 transmits the driving signal SD1. When the switching circuit SW2 is turned on, the input-output pin 135 transmits the reference voltage DK and the voltage $V_{PN5}$ of the pin $PN_5$.

In one embodiment, the voltages $V_{PN5} \sim V_{PN8}$ of the pins $PN_5 \sim PN_8$ are one-third or one-quarter of the amplitudes of the driving signals SD1~SD4. Therefore, even if the pins $PN_5 \sim PN_8$ are coupled to the pins $PN_1 \sim PN_4$, the voltages $V_{PN5} \sim V_{PN8}$ of the pins $PN_5 \sim PN_8$ do not affect the image displayed on the display device 110.

For example, assume that the peak voltage of each of the driving signals SD1~SD4 is 4V. In this case, the peak value of each of the voltages $V_{PN5} \sim V_{PN8}$ of the pins $PN_5 \sim PN_8$ is about 1.3V (i.e., one-third of the peak voltage of each of the driving signals SD1~SD4) or about 1V (i.e., one-quarter of the peak voltage of the driving signal SD1. Since the voltages $V_{PN5} \sim V_{PN8}$ of the pins $PN_5 \sim PN_8$ are small, the image displayed on the display device 110 does not be interfered by the voltages $V_{PN5} \sim V_{PN8}$ of the pins $PN_5 \sim PN_8$. In other embodiments, the voltages $V_{PN5} \sim V_{PN8}$ of the pins $PN_5 \sim PN_8$ are less than IV.

The microcontroller circuit 132 generates the switching signal SEL to control the switching circuits SW1 and SW2. In this embodiment, the switching circuits SW1 and SW2 are not simultaneously turned on. For example, when the microcontroller circuit 132 turns on the switching circuit SW1, the microcontroller circuit 132 does not turn on the switching circuit SW2. When the microcontroller circuit 132 turns on the switching circuit SW2, the microcontroller circuit 132 does not turn on the switching circuit SW1.

The structure of microcontroller circuit 132 is not limited in the present disclosure. In one embodiment, the microcontroller circuit 132 is a microcontroller unit (MCU). In this embodiment, the microcontroller circuit 132 utilizes a single switching signal (e.g., SEL) to control the switching circuits SW1 and SW2, but the disclosure is not limited thereto. In other embodiments, the microcontroller circuit 132 utilizes two switching signals to control the switching circuits SW1 and SW2 respectively.

In other embodiments, the microcontroller circuit 132 further triggers the image driver 131 and the sensing circuit 133. When the image driver 131 is triggered, the image driver 131 generates the driving signals SD1~SD4. At this time, the microcontroller circuit 132 utilizes the switching signal SEL to turn on the switching circuit SW1 and turn off the switching circuit SW2. Therefore, the input-output pins 135~138 output the driving signals SD1~SD4 to the display device 110. The display device 110 displays an image according to the driving signals SD1~SD4.

When the microcontroller circuit 132 triggers the sensing circuit 133, the sensing circuit 133 generates the reference voltage DK. At this time, the microcontroller circuit 132 utilizes the switching signal SEL to turn on the switching circuit SW2 and turn off the switching circuit SW1. Therefore, the input-output pins 135~138 first output the reference voltage DK to the capacitive touch device 120 and then provide the voltages $V_{PN5} \sim V_{PN8}$ of the pins $PN_5 \sim PN_8$ to the sensing circuit 133. In this case, the sensing circuit 133 determines whether any of the areas 121~124 is touched according to the voltages $V_{PN5} \sim V_{PN8}$ of the pins $PN_5 \sim PN_8$.

In other embodiments, when the microcontroller circuit 132 triggers the sensing circuit 133, the microcontroller circuit 132 may direct the image driver 131 to stop generating the driving signals SD1~SD4. In some embodiments, the image driver 131 may still generate the driving signals SD1~SD4. However, since the microcontroller circuit 132 turns off the switching circuit SW1, the switching circuit SW1 does not transmit the driving signals SD1~SD4 to the input-output pins 135~138. In this case, since the display device 110 has charge storage elements, if the display device 110 does not receive the driving signals SD1~SD4 the display device 110 is capable of maintaining the image.

In this embodiment, the duration which the switching circuit SW2 is turned on is shorter than the duration which the switching circuit SW1 is turned on. For example, the duration which the switching circuit SW2 is turned on may be one tenth of the duration which the switching circuit SW1 is turned on. Therefore, even if the switching circuit SW1 briefly stops transmitting the driving signals SD1~SD4, the image displayed on the display device 110 does not be interfered by the voltages $V_{PN5} \sim V_{PN8}$ of the pins $PN_5 \sim PN_8$. In one embodiment, the duration which the switching circuit SW1 is turned on is about 250 us, and the duration which the switching circuit SW2 is turned on is about 250 ns.

Additionally, since the voltages $V_{PN5} \sim V_{PN8}$ of the pins $PN_5 \sim PN_8$ are small, even if the display device 110 receives the voltages $V_{PN5} \sim V_{PN8}$ of the pins $PN_5 \sim PN_8$, the image displayed on the display device 110 does not be interfered by the voltages $V_{PN5} \sim V_{PN8}$ of the pins $PN_5 \sim PN_8$. In one embodiment, the voltages $V_{PN5} \sim V_{PN8}$ of the pins $PN_5 \sim PN_8$ may be lower than one-third of the driving signals SD1~SD4. In another embodiment, the voltages $V_{PN5} \sim V_{PN8}$ of the pins $PN_5 \sim PN_8$ may be lower than one-quarter of the driving signals SD1~SD4. In other embodiments, the voltages $V_{PN5} \sim V_{PN8}$ of the pins $PN_5 \sim PN_8$ are lower than IV.

The invention does not limit when the microcontroller circuit 132 turns on the switching circuit SW2. Assume that the display device 110 displays many frames in 1 sec. In one embodiment, the microcontroller circuit 132 turns on the switching circuit SW2 between two frames. In another embodiment, the microcontroller circuit 132 turns on the microcontroller circuit 132 at least one time when the display device 110 displays one frame.

Figure 2:
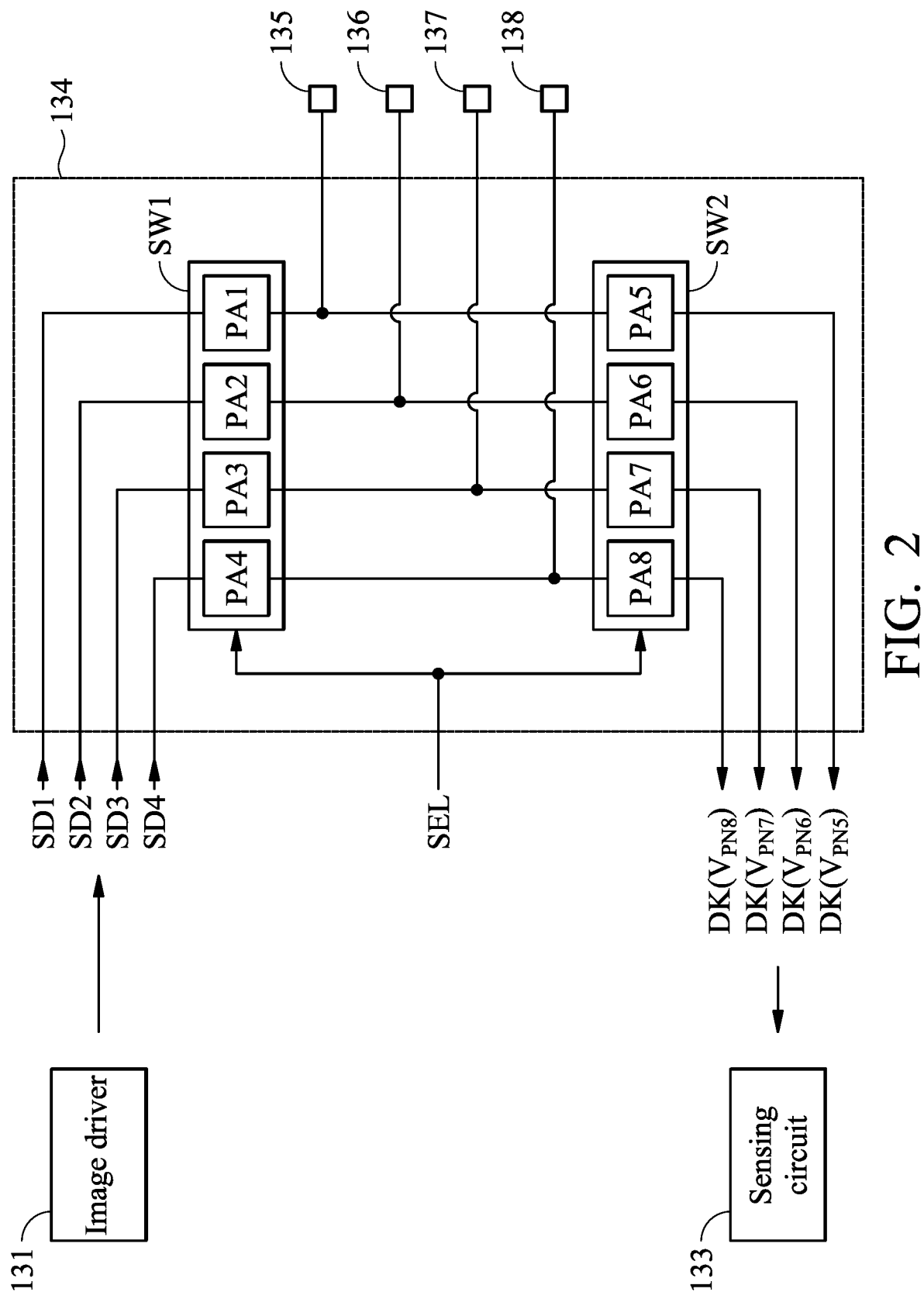
FIG. 2 is a schematic diagram of an exemplary embodiment of a transmission circuit, according to various aspects of the present disclosure.

FIG. 2 is a schematic diagram of an exemplary embodiment of the transmission circuit 134, according to various aspects of the present disclosure. As shown in FIG. 2, the switching circuit SW1 is coupled between the image driver 131 and the input-output pins 135~138 and comprises paths PA1~PA4. In this embodiment, the paths PA1~PA4 transmit the driving signals SD1~SD4 to the input-output pins 135~138 according to the switching signal SEL.

For example, when the switching signal SEL turns on the paths PA1~PA4, the paths PA1~PA4 transmit the driving signals SD1~SD4 to the input-output pins 135~138. When the switching signal SEL does not turn on the paths PA1~PA4, the paths PA1~PA4 stop transmitting the driving signals SD1~SD4 to the input-output pins 135~138. The structure of switching circuit SW1 is not limited in the present disclosure. In one embodiment, the switching circuit SW1 comprises a plurality of switches to form the paths PA1~PA4. In this embodiment, the paths PA1~PA4 are simultaneously turned on or off. In other embodiments, when one of the paths PA1~PA4 is turned on, another of the paths PA1~PA4 is turned off.

The switching circuit SW2 comprises paths PA5~PA8. The path PA5 is coupled between the sensing circuit 133 and the input-output pin 135 and transmits the reference voltage DK and the voltage $V_{PN5}$ of the pin $PN_5$ according to the switching signal SEL. The path PA6 is coupled between the sensing circuit 133 and the input-output pin 136 and transmits the reference voltage DK and the voltage $V_{PN6}$ of the pin $PN_6$ according to the switching signal SEL. The path PA7 is coupled between the sensing circuit 133 and the input-output pin 137 and transmits the reference voltage DK and the voltage $V_{PN7}$ of the pin $PN_7$ according to the switching signal SEL. The path PA8 is coupled between the sensing circuit 133 and the input-output pin 138 and transmits the reference voltage DK and the voltage $V_{PN8}$ of the pin $PN_8$ according to the switching signal SEL. For example, when the switching signal SEL turns on the paths PA5~PA8, the paths PA5~PA8 first transmit the reference voltage DK to the input-output pins 135~138 and then transmit the voltages $V_{PN5} \sim V_{PN8}$ of the pins $PN_5 \sim PN_8$ to the sensing circuit 133. When the switching signal SEL turns off the paths PA5~PA8, the paths PA5~PA8 stop transmitting the reference voltage DK and the voltages $V_{PN5} \sim V_{PN8}$ of the pins $PN_5 \sim PN_8$. In this embodiment, the paths PA5~PA8 may be turned on or off simultaneously. In other embodiments, when one of the paths PA5~PA8 is turned on, another of the paths PA5~PA8 is turned off.

In one embodiment, the paths coupled to the same input-output pin are not simultaneously turned on. Taking the input-output pin 135 as an example, the input-output pin 135 is coupled to the paths PA1 and PA5. In this case, when the path PA1 is turned on, the path PA5 is turned off. When the path PA5 is turned on, the path PA1 is turned off. The structure of the switching circuit SW2 is not limited in the present disclosure. In one embodiment, the switching circuit SW2 comprises a plurality of switches to provide the paths PA5~PA8.

Figure 3:
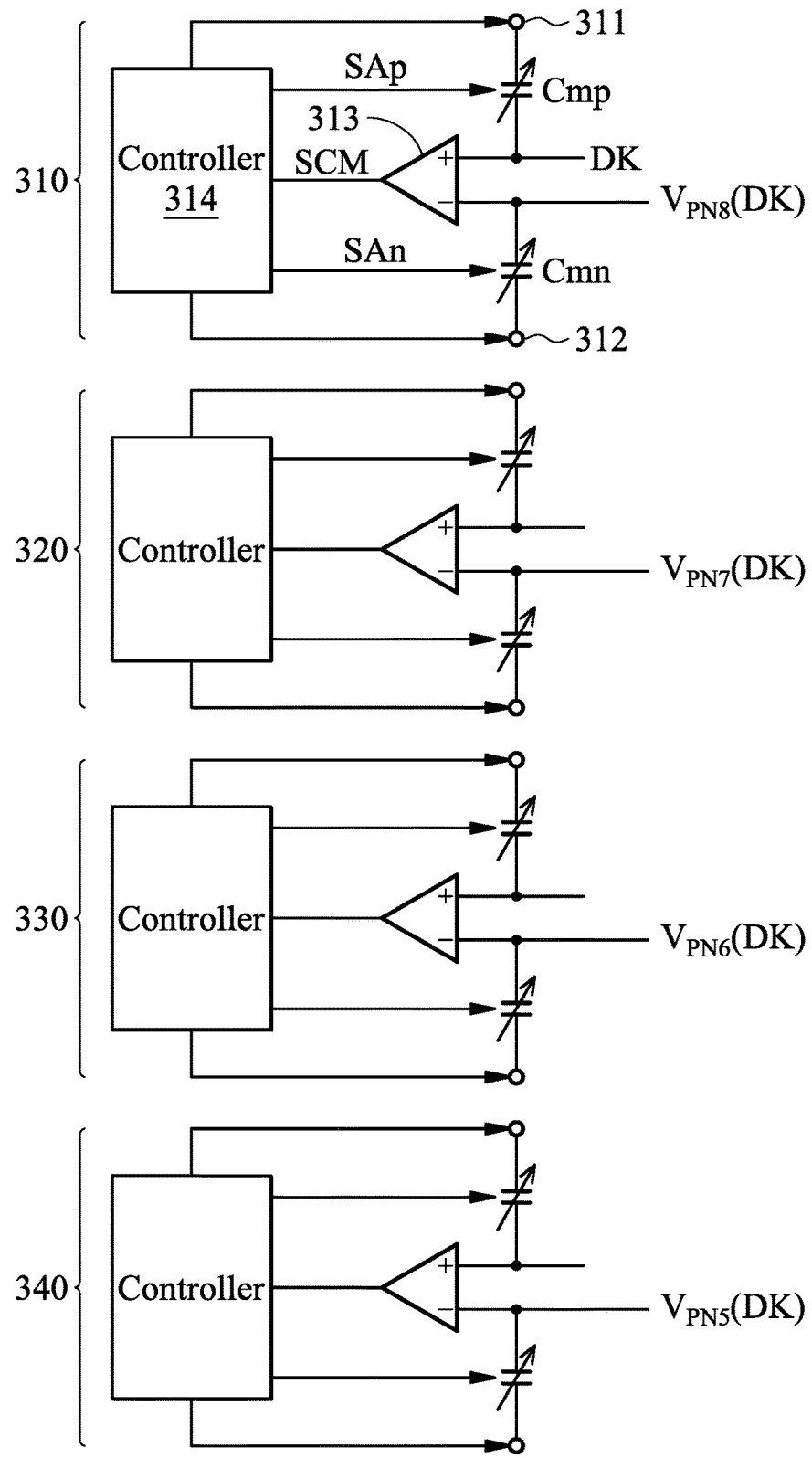
FIG. 3 is a schematic diagram of an exemplary embodiment of a sensing circuit, according to various aspects of the present disclosure.

FIG. 3 is a schematic diagram of an exemplary embodiment of a sensing circuit, according to various aspects of the present disclosure. The sensing circuit 133 comprises sensing units 310~340. The sensing unit 310 determines whether the area 121 of the display device 110 is touched. The sensing unit 320 determines whether the area 122 of the display device 110 is touched. The sensing unit 330 determines whether the area 123 of the display device 110 is touched. The sensing unit 340 determines whether the area 124 of the display device 110 is touched. Since the features of the sensing units 310~340 are the same, the sensing unit 310 is given as an example.

The sensing unit 310 comprises capacitors Cmp and Cmn, a comparator 313 and a controller 314. The capacitor Cmp is coupled between the node 311 and the non-inverted input of the comparator 313 to provide the reference voltage DK. The capacitor Cmn is coupled between the inverted input of the comparator 313 and the node 312. In other embodiments, the capacitor Cmn may be coupled to the inverted input of the comparator 313 and the node 311. In this embodiment, the capacitors Cmp and Cmn are variable capacitors.

The non-inverted input of the comparator 313 is coupled to the capacitor Cmp to receive the reference voltage DK. The inverted input of the comparator 313 receives the voltage $V_{PN8}$ of the pin $PN_8$ and is coupled to the capacitor Cmn. In this embodiment, the comparator 313 compares the reference voltage DK and the voltage $V_{PN8}$ to generate a compared signal SCM.

The controller 314 determines whether a specific area (e.g., the area 124) of the capacitive touch device 120 is touched according to the compared signal SCM. In one embodiment, the controller 314 first generates the reference voltage DK and provides the reference voltage DK to the non-inverted input of the comparator 313. Then, the controller 314 determines whether a specific area of the capacitive touch device 120 is touched according to the voltage of the inverted input of the comparator 313. In this embodiment, the controller 314 obtains the touch pressure according to the voltage of the inverted input of the comparator 313.

For example, in an initial period, the controller 314 first provides a predetermined voltage to the nodes 311 and 312. Therefore, the capacitors Cmp and Cmn start to store charge to generate the reference voltage DK. At this time, the voltages at the inverted input and the non-inverted input of the comparator 313 are equal to the reference voltage DK. If the switching circuit SW2 is turned on, the switching circuit SW2 transmits the reference voltage DK to the pins $PN_5$~$PN_8$ of the capacitive touch device 120.

In such cases, when the area 124 of the capacitive touch device 120 is touched, the capacitance of the sensing element 128 in the area 124 is changed such that the voltage $V_{PN8}$ of the pin $PN_8$ is changed and is not equal to the reference voltage DK. Since the voltage (i.e., $V_{PN8}$) of the inverted input of the comparator 313 is not equal to the voltage (DK) of the non-inverted input, the controller 314 obtains that the area 124 is touched.

In one embodiment, the controller 314 generates adjustment signals Sap and San to adjust the capacitances of the capacitors Cmp and Cmn such that the voltage of the inverted input of the comparator 313 is equal to the voltage (DK) of the non-inverted input of the comparator 313. After the voltage of the inverted input of the comparator 313 is equal to the voltage of the non-inverted input of the comparator 313, the controller 314 obtains the touch strength according to the amplitude of the capacitance of the capacitors Cmp and Cmn being adjusted. In one embodiment, the controller 314 generates a notification signal to notify the microcontroller circuit 132 that a touch event occurs.

Figure 4:
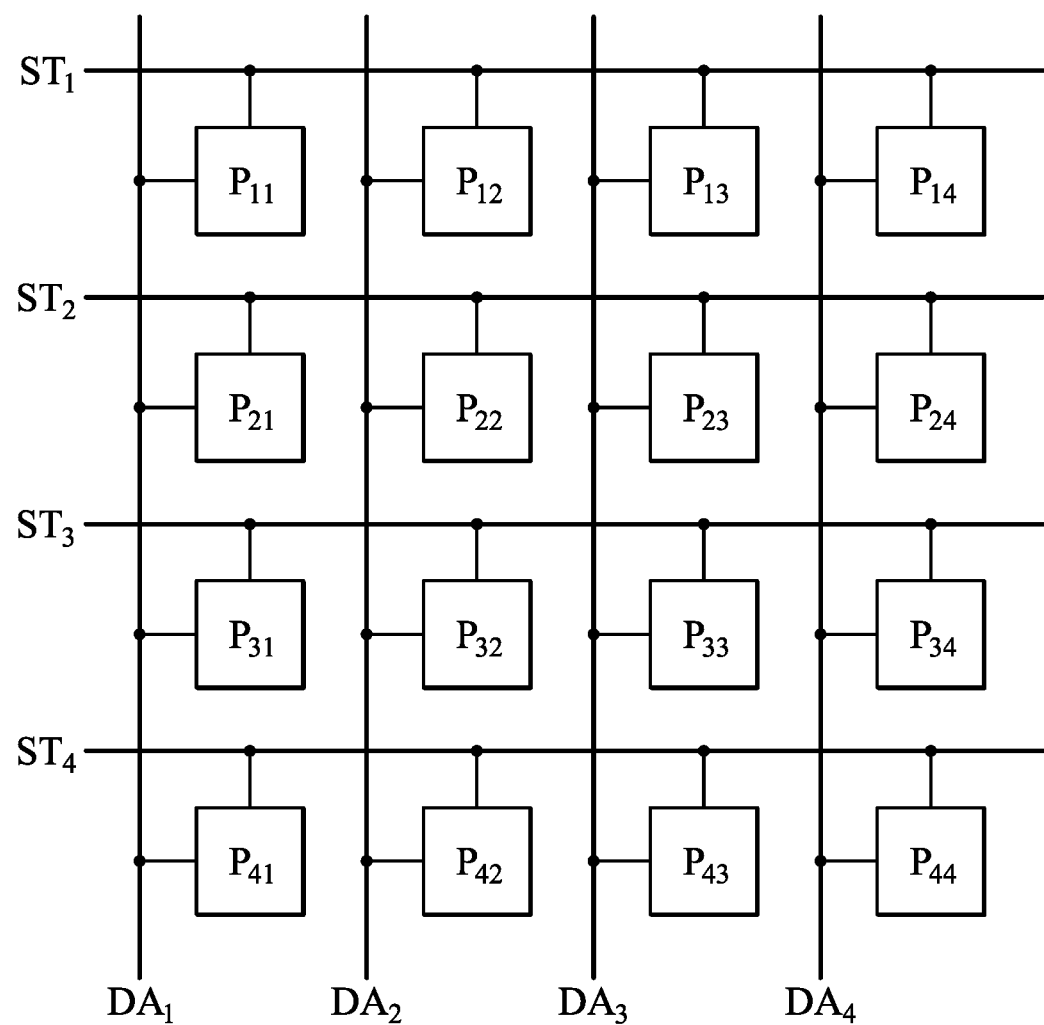
FIG. 4 is a schematic diagram of an exemplary embodiment of a display device, according to various aspects of the present disclosure.

FIG. 4 is a schematic diagram of an exemplary embodiment of the display device 100, according to various aspects of the present disclosure. As shown in FIG. 4, the display device 100 comprises pixels $P_{11}$~$P_{44}$, but the disclosure is not limited thereto. In other embodiments, the display device 100 comprises more or fewer pixels. In this embodiment, the display device 100 is an active matrix (AM) liquid-crystal display device. In such cases, the pixels $P_{11}$~$P_4$ receive and store data signals $DA_1$~$DA_4$ according to turn-on signals $ST_1$~$ST_4$. Taking the pixel $P_{11}$ as an example, the pixel $P_{11}$ receives and stores the data signal $SD_1$ according to the turn-on signal $ST_1$. In one embodiment, each of the pixels $P_{11}$~$P_{44}$ comprises a storage capacitor (now shown) to store the data signals $DA_1$~$DA_4$.

In one embodiment, the turn-on signals $ST_1$~$ST_4$ are driving signals SD1~SD4. In this case, the data signals $DA_1$~$DA_4$ may be generated by the image driver 131. The image driver 131 provides the data signals $DA_1$~$DA_4$ to the display device 110 via other input-output pins. These input-output pins transmitting the data signals $DA_1$~$DA_4$ may be coupled to or not coupled to the capacitive touch device 120.

In another embodiment, the data signals $DA_1$~$DA_4$ are the driving signals SD1~SD4. In this case, the image driver 131 may provide the turn-on signals $ST_1$~$ST_4$ to the display device 110 via other input-output pins. These input-output pins transmitting the turn-on signals $ST_1$~$ST_4$ may be coupled to or not coupled to the capacitive touch device 120.

In other embodiments, the driving signals SD1~SD4 are COM/SEG signals. In this case, the pixels $P_{11}$~$P_{44}$ receive and store the data signals $DA_1$~$DA_4$ according to the turn-on signals $ST_1$~$ST_4$ and the COM/SEG signals.

In some embodiment, the display device 100 is a passive matrix (PM) display device. In such cases, the driving signals SD1~SD4 may be referred to as common signals, and the data signals $DA_1$~$DA_4$ may be referred to as segment signals. The levels of the driving signals SD1~SD4 and data signals $DA_1$~$DA_4$ are utilized to adjust the tilt angles of the liquid-crystal molecules of the pixels $P_{11}$~$P_{44}$, thereby changing the light transmittance of the display device 100. In one embodiment, the pixels $P_{11}$~$P_{44}$, do not have any memory function. Therefore, when the driving signals SD1~SD4 and the data signals $DA_1$~$DA_4$ disappear, the liquid-crystal molecules of the pixels $P_{11}$~$P_{44}$ return to their original positions.

In some embodiments, the display device 110 further comprises a driving circuit (not shown). In this case, the driving circuit may generate the turn-on signals $ST_1$~$ST_4$ or the data signals $DA_1$~$DA_4$ according to the driving signals SD1~SD4. In other embodiments, the driving circuit of the display device 110 generates the turn-on signals $ST_1$~$ST_4$ and the data signals $DA_1$~$DA_4$ according to the driving signals SD1~SD4.

In this embodiment, since the display device 110 and the capacitive touch device 120 share the input-output pins (e.g., 135~138), the number of input-output pins of the control circuit 130 is reduced. Furthermore, since the voltages $V_{PN5}$~$V_{PN5}$ of the pins $PN_5$~$PN_8$ of the capacitive touch device 120 are extremely lower than the voltages of the pins $PN_1$~$PN_4$ of the display device 110, the display device 110 is not interfered by the voltages $V_{PN5}$~$V_{PN8}$. Additionally, the duration which the capacitive touch device 120 outputs the voltages $V_{PN5}$~$V_{PN8}$ is short, the voltages $V_{PN5}$~$V_{PN8}$ do not affect the display device 110.

Figure 5A:
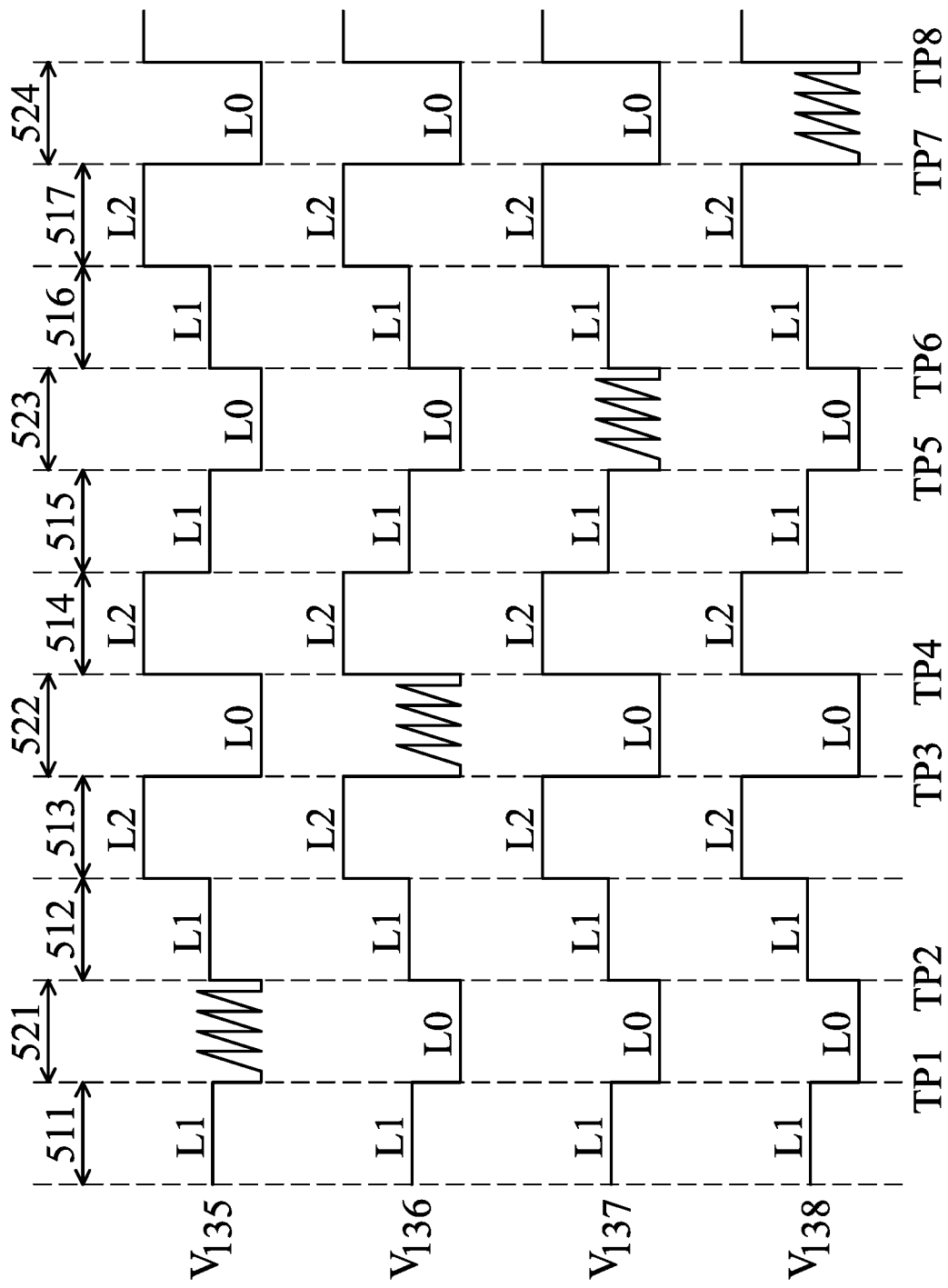
FIG. 5A-5C are schematic diagrams of the variations of the voltage levels of the input-output pins.

FIG. 5A is a schematic diagram of the variations of the voltage levels of the input-output pins 135~138. The symbols $V_{135}$~$V_{138}$ represent the voltage levels of the input-output pins 135~138, respectively. In the display periods 511~518, each of voltage levels $V_{135}$~$V_{138}$ may set to a corresponding level. The display device 110 displays images according to the voltage levels $V_{135}$~$V_{138}$.

Taking the voltage level $V_{135}$ as an example, the image driver 131 may set the voltage level $V_{135}$ to the level L1 in the display periods 511 and 512. In other embodiments, the voltage level $V_{135}$ in the display period 511 may be different from the voltage level $V_{135}$ in the display period 512. In the display periods 513 and 514, the image driver 131 may set the voltage level $V_{135}$ to the level L2 which is higher than the level L1. In other embodiments, the voltage level $V_{135}$ in the display period 513 or 514 may be lower than the voltage level $V_{135}$ in one of the display periods 511 and 512.

In the display periods 515 and 516, the image driver 131 may set the voltage level $V_{135}$ to the level L1 again. In other embodiments, the voltage level $V_{135}$ in one of the display periods 515 and 516 may be different from the voltage level $V_{135}$ in one of the display periods 511 and 512. In the display periods 517 and 518, the image driver 131 may set the voltage level $V_{135}$ to the level L2. In other embodiments, the voltage level $V_{135}$ in one of the display periods 517 and 518 may be different from the voltage level $V_{135}$ in one of the display periods 513 and 514. Each of the voltage levels $V_{135}$~$V_{138}$ can be set to any level, as long as the level is capable of driving the display device 110.

In the sensing period 521, the sensing circuit 133 performs a sensing operation for the input-output pin 135. During performing the sensing operation, the sensing circuit 133 may provide the reference voltage DK to the input-output pin 135 multiple times. Each time the sensing circuit 133 provides the reference voltage DK to the input-output pin 135, the sensing circuit 133 detects the voltage level $V_{135}$. The sensing circuit 133 calculates the number of times the voltage level $V_{135}$ is not equal to the reference voltage DK. In such cases, when the number of times the voltage level $V_{135}$ is not equal to the reference voltage DK is greater than a predetermined value, it means that a sensing area corresponding to the input-output pin 135 is touched. When the number of times the voltage level $V_{135}$ is not equal to the reference voltage DK is not greater than the predetermined value, it means that a sensing area corresponding to the input-output pin 135 is not touched.

In the sensing period 521, the sensing circuit 133 does not perform the sensing operation for the input-output pins 136~138. In this cases, each of the voltage levels $V_{136}$~$V_{138}$ may be set to the level L0, but the disclosure is not limited thereto. In some embodiments, the image driver 131 or the sensing circuit 133 sets the voltage levels $V_{136}$~$V_{138}$ to the level L0, a high level (e.g., the level L2) or a floating level in the sensing period 521. In one embodiment, the image driver 131 and the sensing circuit 133 may not provide any voltage to the input-output pins 136~138. In this such cases, each of the voltage levels $V_{136}$~$V_{138}$ is a floating level.

In the sensing period 522, the sensing circuit 133 performs the sensing operation for the input-output pin 136. The sensing circuit 133 does not perform the sensing operation for the input-output pins 135, 137 and 138. At this time, each of the voltage levels $V_{135}$, $V_{137}$, and $V_{138}$ is set to the level L0. In other embodiments, each of the voltage levels $V_{135}$, $V_{137}$, and $V_{138}$ may be set a high level or a floating level. When the sensing circuit 133 performs the sensing operation for the input-output pin 136, the sensing circuit 133 may provide the reference voltage DK to the input-output pin 136 multiple times. Each time the sensing circuit 133 provides the reference voltage DK to the input-output pin 136, the sensing circuit 133 detects the voltage level $V_{136}$. In one embodiment, the sensing circuit 133 calculates the number of times the voltage level $V_{136}$ is not equal to the reference voltage DK. In such cases, when the number of times the voltage level $V_{136}$ is not equal to the reference voltage DK is greater than the predetermined value, it means that a sensing area corresponding to the input-output pin 136 is touched. When the number of times the voltage level $V_{136}$ is not equal to the reference voltage DK is not greater than the predetermined value, it means that a sensing area corresponding to the input-output pin 136 is not touched.

In the sensing period 523, the sensing circuit 133 performs the sensing operation for the input-output pin 137. The sensing circuit 133 does not perform the sensing operation for the input-output pins 135, 136, and 138 in the sensing period 523. Since the sensing operation for the input-output pin 137 is the same as the sensing operation for the input-output pin 135, the description of the sensing operation for the input-output pin 137 is omitted.

In the sensing period 524, the sensing circuit 133 performs the sensing operation for the input-output pin 138. The sensing circuit 133 does not perform the sensing operation for the input-output pins 135~137 in the sensing period 524. Since the sensing operation for the input-output pin 138 is the same as the sensing operation for the input-output pin 135, the description of the sensing operation for the input-output pin 138 is omitted.

In this embodiment, the sensing period 521 is specified by the end time point TP1 of the display period 511 and the start time point TP2 of the display period 512. The sensing period 522 is specified by the end time point TP3 of the display period 513 and the start time point TP4 of the display period 514. The sensing period 523 is specified by the end time point TP5 of the display period 515 and the start time point TP6 of the display period 516. The sensing period 524 is specified by the end time point TP7 of the display period 517 and the start time point TP8 of the display period 518. In each sensing period, the sensing circuit 133 only detects the voltage level of one input-output pin.

Taking the sensing period 521 as an example, the sensing circuit 133 performs the sensing operation for the input-output pin 135 multiple times from the end time point TP1 to the start time point TP2. From the end time point TP1 to the start time point TP2, the sensing circuit 133 does not perform the sensing operation for the input-output pins 136~138. Additionally, the image driver 131 provides the driving signals SD1~SD4 to the input-output pins 135~138 in the display period 511. Therefore, the display device 110 displays an image. From the end time point TP1 to the start time point TP2, the image driver 131 stops providing the driving signals SD1~SD4. Therefore, the display device 110 stops displaying images. Because the duration from the end time point TP1 to the start time point TP2 is short, it is not easy to be found by users.

Figure 5B:
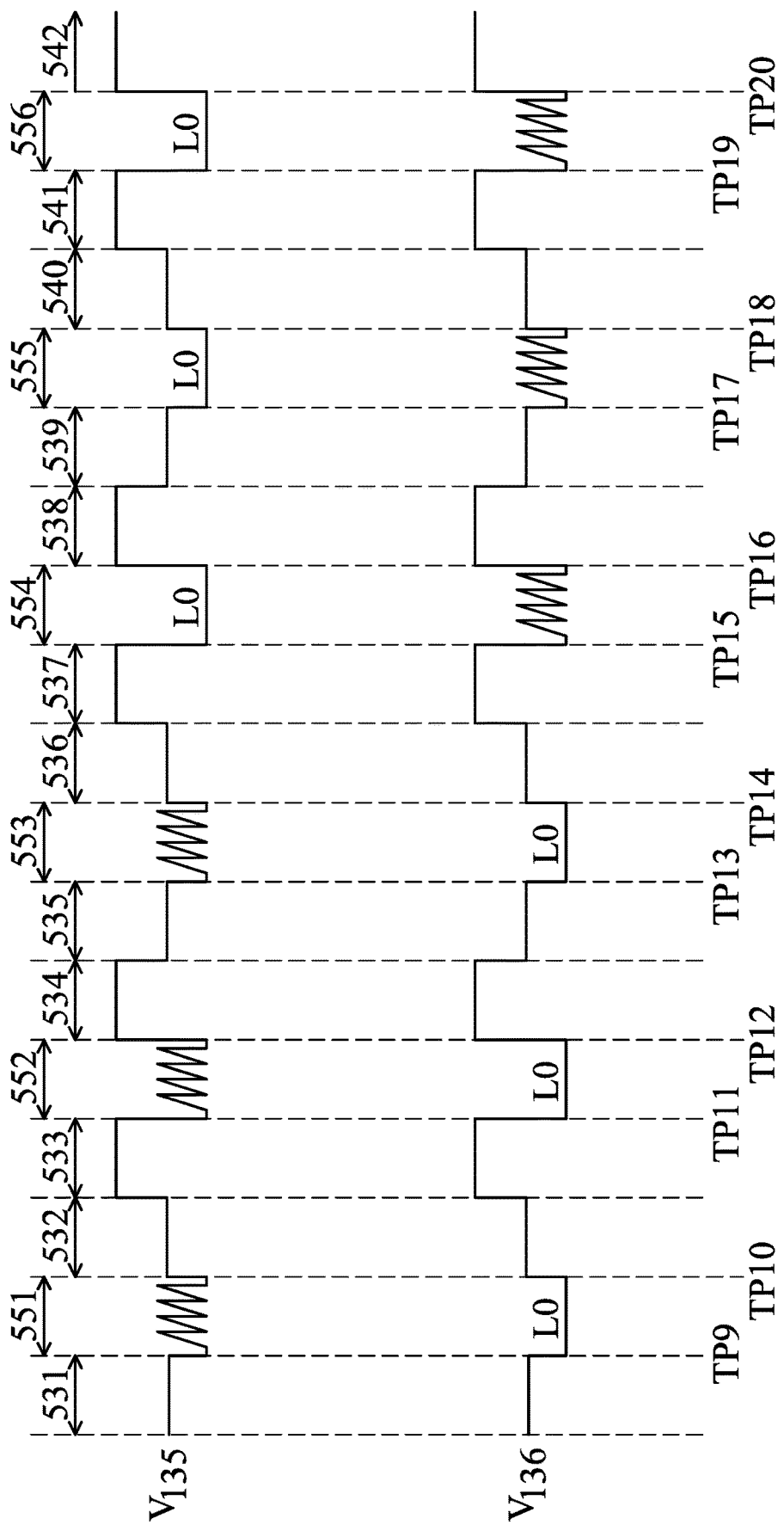

FIG. 5B is another schematic diagram of the variations of the voltage levels of the input-output pins 135 and 136. Since the operations of input-output pins 135~138 are the same, only the input-output pins 135 and 136 are shown in FIG. 5B. In the display periods 531~542, the image driver 131 may set each of voltage levels $V_{135}$ and $V_{136}$ to a corresponding level. Therefore, the display device 110 displays images according to the voltages $V_{135}$ and $V_{136}$ in the display periods 531~542. In other embodiments, each of the voltage levels $V_{135}$ and $V_{136}$ can be set to any level, as long as the level is capable of driving the display device 110 to display images in the display periods 531~542.

In the sensing periods 551~553, the sensing circuit 133 performs the sensing operation for the input-output pin 135. The sensing circuit 133 does not perform the sensing operation for the input-output pin 136 in the sensing periods 551~553. In the sensing periods 554~556, the sensing circuit 133 performs the sensing operation for the input-output pin 136. The sensing circuit 133 does not perform the sensing operation for input-output pin 135 in the sensing periods 554~556. In this embodiment, the sensing circuit 133 performs the sensing operation for a single input-output pin in many sensing periods.

In one embodiment, the sensing period 551 is specified by the end time point TP9 of the display period 531 and the start time point TP10 of the display period 532. The sensing period 552 is specified by the end time point TP11 of the display period 533 and the start time point TP12 of the display period 534. The sensing period 553 is specified by the end time point TP13 of the display period 535 and the start time point TP14 of the display period 536. The sensing period 554 is specified by the end time point TP15 of the display period 537 and the start time point TP16 of the display period 538. The sensing period 554 is specified by the end time point TP17 of the display period 539 and the start time point TP18 of the display period 540. The sensing period 556 is specified by the end time point TP19 of the display period 541 and the start time point TP20 of the display period 542. In each sensing period, the sensing circuit 133 only detects the voltage level of one input-output pin.

Figure 5C:
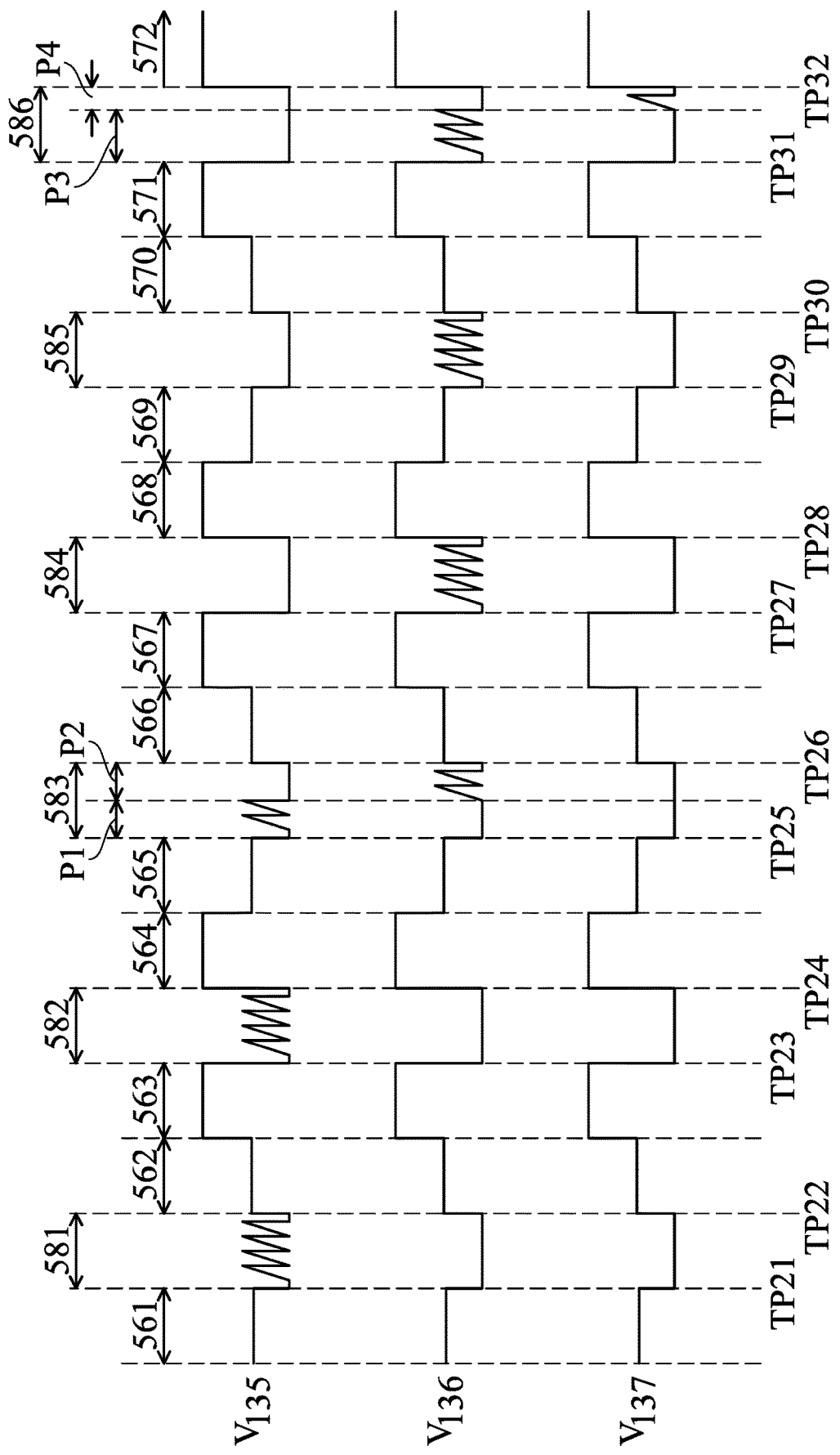

FIG. 5C is a schematic diagram of the variations of the voltage levels of the input-output pins 135~137. For clarity, only the voltage levels $V_{135}$~$V_{137}$ are shown in FIG. 5C. In the display periods 561~572, each of voltage levels $V_{135}$~$V_{137}$ may set to a corresponding level. In other embodiments, each of the voltage levels $V_{135}$~$V_{137}$ can be set to any level, as long as the level is capable of driving the display device 110 in the display periods 561~572. In such cases, the voltage level of one of the input-output pins 135~137 may be different from the voltage level of another of the input output pins 135~137 in the same display period.

In the sensing periods 581 and 582, and the period P1 of the sensing period 583, the sensing circuit 133 performs the sensing operation for the input-output pin 135. The sensing circuit 133 does not perform the sensing operation for the input-output pins 136 and 137 in the periods 581, 582, and P1. When the sensing circuit 133 performs the sensing operation for the input-output pin 135, each of the voltage levels $V_{136}$ and $V_{137}$ may be set to the level L0, but the disclosure is not limited thereto. In one embodiment, at least one of the voltage levels $V_{136}$ and $V_{137}$ may be a high level or a floating level.

In the period P2 of the sensing period 583, the sensing circuit 133 performs the sensing operation for the input-output pin 136. In the sensing periods 584 and 585, the sensing circuit 133 performs the sensing operation for the input-output pin 136. In the period P3 of the sensing period 586, the sensing circuit 133 performs the sensing operation for the input-output pin 136. In the periods P2, 584, 585 and P3, the sensing circuit 133 does not perform the sensing operation for the input-output pins 135 and 137. In one embodiment, each of the voltage levels $V_{135}$ and $V_{137}$ may be set to the level L0 in the periods P2, 584, 585 and P3. In other embodiments, at least one of the voltage levels $V_{135}$ and $V_{137}$ may be a high level or a floating level in the periods P2, 584, 585 and P3.

In the period P4 of the sensing period 586, the sensing circuit 133 performs the sensing operation for the input-output pin 137. The sensing circuit 133 does not perform the sensing operation for the input-output pins 135 and 136. In such cases, each of the voltage levels $V_{135}$ and $V_{136}$ is the level L0, but the disclosure is not limited thereto. In one embodiment, at least one of the voltage levels $V_{135}$ and $V_{136}$ may be a high level or a floating level.

In this embodiment, the sum of the duration of the periods 581, 582, and P1 is the same as the sum of the duration of the periods P2, 584, 585, and P3. In other words, the duration when the sensing circuit 133 performing the sensing operation for one input-output pin is the same as the duration when the sensing circuit 133 performing the sensing operation for another input-output pin.

Figure 6A:
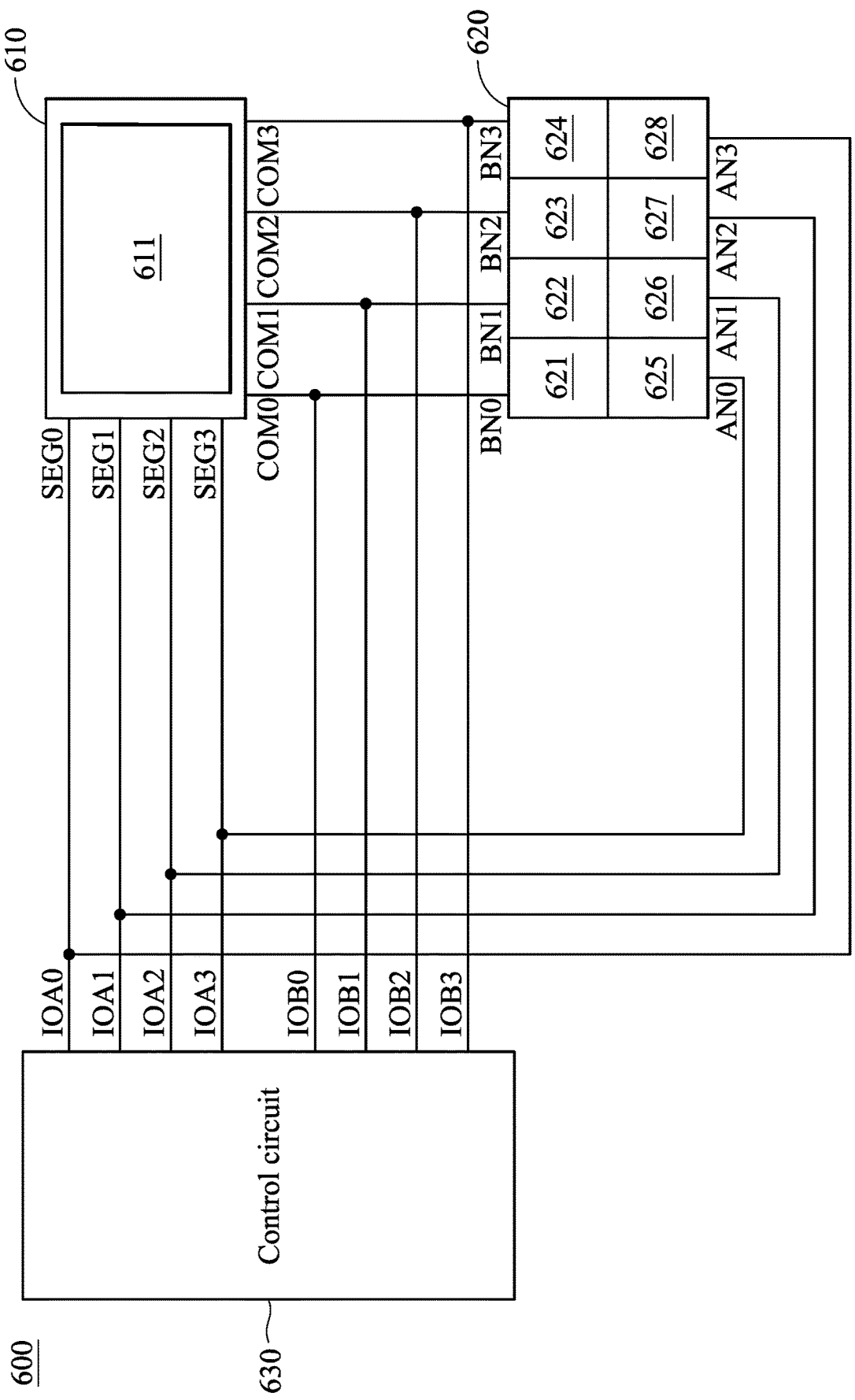
FIG. 6A is a schematic diagram of another exemplary embodiment of the operating system according to various aspects of the present disclosure.

FIG. 6A is a schematic diagram of another exemplary embodiment of the operating system according to various aspects of the present disclosure. As shown in FIG. 6A, the operating system 600 comprises a display device 610, a capacitive touch device 620, and a control circuit 630. In one embodiment, the operating system 600 is a display system. In such cases, the display device 610, the capacitive touch device 620, and the control circuit 630 are combined in a display apparatus.

The display device 610 comprises a display area 611, input pins SEG0~SEG3, and COM0~COM3. In one embodiment, each of the input pins SEG0~SEG3 receives a segment signal, and each of the input pins COM0~COM3 receives a common signal. The display area 611 comprises a plurality of pixels (not shown). Each pixel is coupled to one of the input pins SEG0~SEG3 and one of the input pins COM0~COM3. Each pixel is activated according to the voltage difference between one of the input pins SEG0~SEG3 and one of the input pins COM0~COM3.

The kind of display device 610 is not limited in the present disclosure. In one embodiment, the display device 610 is an AM display device. In such case, each pixel may comprise a driving transistor (not shown) and a storage capacitor (not shown). The driving transistor charges the storage capacitor to activate the corresponding pixel.

In another embodiment, the display device 610 is a PM display device, such as a twisted nematic liquid-crystal display (TN LCD) panel or a super twisted nematic liquid-crystal display (STN LCD) panel. In such cases, each pixel in PM display device may comprise a liquid-crystal capacitor. There is not a driving transistor and a storage capacitor in each pixel. One terminal of the liquid-crystal capacitor is directly connected to one of the input pins SEG0~SEG3. The other terminal of the liquid-crystal capacitor is directly connected to one of the input pins COM0~COM3.

In other embodiments, the display device 610 is a PM organic light-emitting diode (OLED) display device. In such cases, each pixel of the display device 610 only comprises an OLED. There is not a driving transistor and a storage capacitor in each pixel. One terminal (e.g., a cathode) of the OLED is directly connected to one of the input pins SEG0~SEG3. The other terminal (e.g., an anode) of the OLED is directly connected to one of the input pins COM0~COM3.

The capacitive touch device 620 comprises sensing areas 621~628, sensing pins AN0~AN3, and BN0~BN3. In one embodiment, each sensing area has at least one sensing element, such as a touch sensor. The sensing element is configured to determine whether the corresponding sensing area is touched. Since the features of the sensing elements in the sensing areas 621~628 are the same as the features of the sensing elements 125~128 shown in FIG. 1, the descriptions of the features of the sensing elements in the sensing areas 621~628 are omitted.

The sensing pins AN0~AN3, and BN0~BN3 output the signals generated by the sensing elements. In one embodiment, each sensing area has one sensing element. In this case, each of sensing pins AN0~AN3, and BN0~BN3 corresponds one sensing element. For example, the sensing elements of the sensing areas 621~624 are electrically connected to the sensing pins BN0~BN3, respectively. The sensing elements of the sensing areas 625~628 are electrically connected to the sensing pins AN0~AN3, respectively. In this embodiment, the sensing pins AN0~AN3 are electrically connected to the input pins SEG3~SEG0, respectively. The sensing pins BN0~BN3 are electrically connected to the input pins COM0~COM3, respectively.

In other embodiments, the capacitive touch device 620 may comprise more sensing areas or fever sensing areas, and more sensing pins or fewer sensing pins. The invention is not limited to the kind of capacitive touch device 620. In one embodiment, the capacitive touch device 620 is a touch keyboard or a touch pad. In other embodiment, the capacitive touch device 620 may cover the display device 610.

The control circuit 630 comprises input-output pins IOA0~IOA3 and IOB0~IOB3. The input-output pins IOA0~IOA3 are electrically connected to the input pins SEG0~SEG3 and the sensing pins AN3~AN0. The input-output pins IOB0~IOB3 are electrically connected to the input pins COM0~COM3 and the sensing pins BN0~BN3. In this embodiment, since the display device 610 and the capacitive touch device 620 share the input-output pins IOA0~IOA3 and IOB0~IOB3. Therefore, the number of the input-output pins of the control circuit 630 is reduced.

In a display period, the control circuit 630 provides the segment signals to the input pins SEG0~SEG3 via the input-output pins IOA0~IOA3 and provides the common signals to the input pins COM0~COM3 via the input-output pins IOB0~IOB3. At this time, the display device 610 displays an image according to the levels of the input pins SEG0~SEG3 and COM0~COM3.

In one embodiment, when the control circuit 630 performs the sensing operation for each of the output pins IOA0~IOA3, the control circuit 630 may set the voltage levels of the output pins IOB0~IOB3 to a first predetermined level. When the control circuit 630 performs the sensing operation for each of the output pins IOB0~IOB3, the control circuit 630 may set the voltage levels of the output pins IOA0~IOA3 to a second predetermined level.

In one embodiment, the second predetermined level is opposite to the first predetermined level. For example, when the first predetermined level is a high level, the second predetermined level is a low level. When the first predetermined level is a low level, the second predetermined level is a high level. In another embodiment, each of the first and second predetermined levels is a floating level. Taking the input-output pin IOA0 as an example, the control circuit 630 may not provide any voltages the input-output pin IOA0. Therefore, the voltage level of the input-output pin IOA0 is a floating level. In some embodiments, the control circuit 630 sets the impedance of the input-output pin IOA0 at a high impedance.

In one embodiment, the input-output pins IOA0~IOA3 transmit the same kind of signals. Therefore, the control circuit 630 classifies the input-output pins IOA0~IOA3 into the first pin group. Additionally, the input-output pins IOB0~IOB3 transmit the same kind of signals. Therefore, the control circuit 630 classifies the input-output pins IOB0~IOB3 into the second pin group.

Figure 6B:
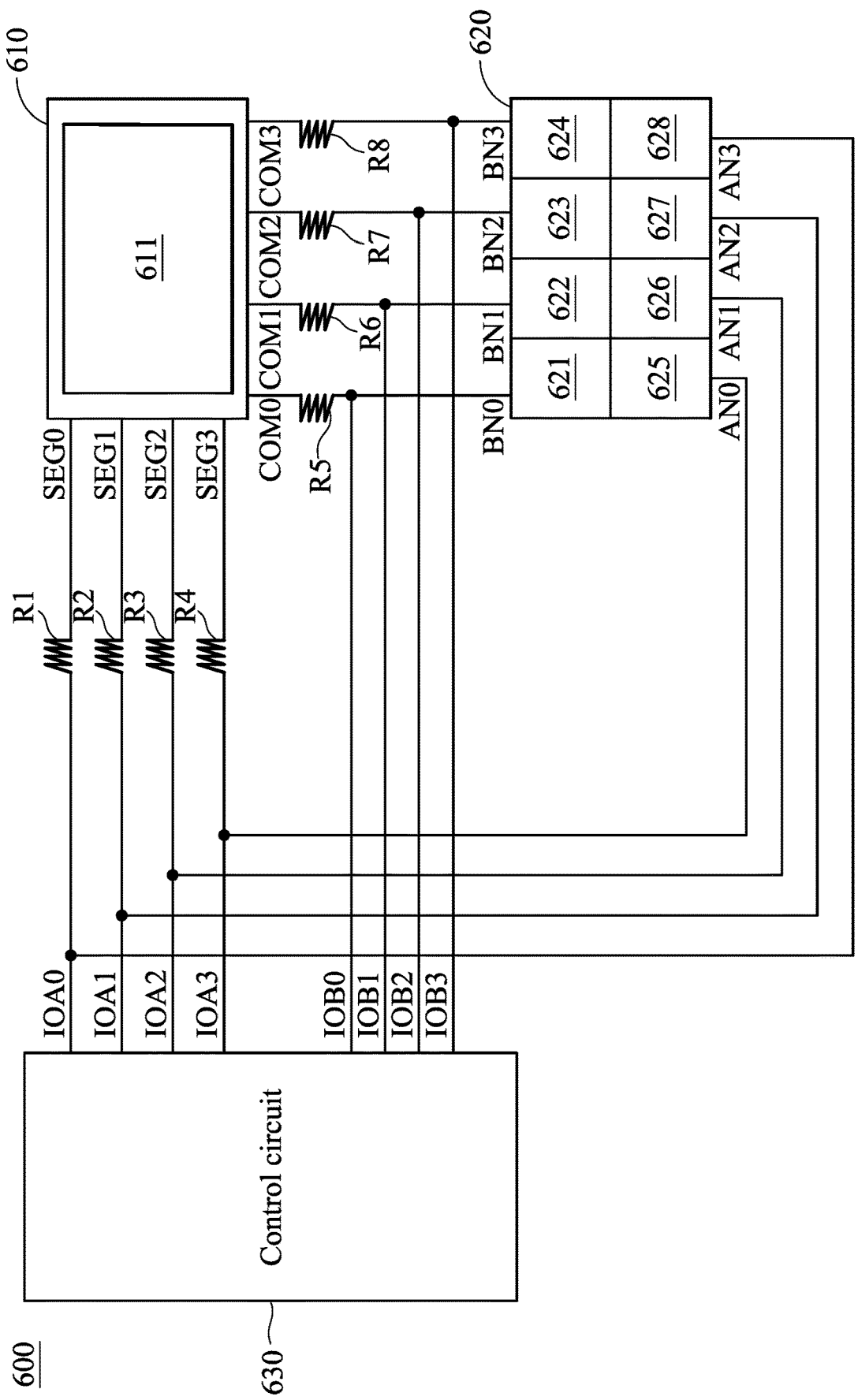
FIG. 6B is a schematic diagram of another exemplary embodiment of the operating system according to various aspects of the present disclosure.

FIG. 6B is a schematic diagram of another exemplary embodiment of the operating system according to various aspects of the present disclosure. FIG. 6B is similar to FIG. 6A except for the addition of resistors R1~R8. The resistors R1~R4 are coupled between the input-output pins IOA0~IOA3 and the input pins SEG0~SEG3, respectively. The resistors R5~R8 are coupled between the input-output pins IOB0~IOB3 and the input pins COM0~COM3, respectively. Taking the resistors R1 and R5 as an example, the resistor R1 is coupled between the input-output pin IOA0 and the input pin SEG0, and the resistor R5 is coupled between the input-output pins IOB0 and the input pin COM0. In one embodiment, the resistance of each of resistors R1~R8 is within 1KΩ~10KΩ.

In some embodiments, the display device 610 is a liquid-crystal display device. The existence of resistors R1~R8 increase the accuracy of the sensing operation. In such cases, the control circuit 630 performs the sensing operation to detect the touched area in the capacitive touch device 620.

Figure 7A:
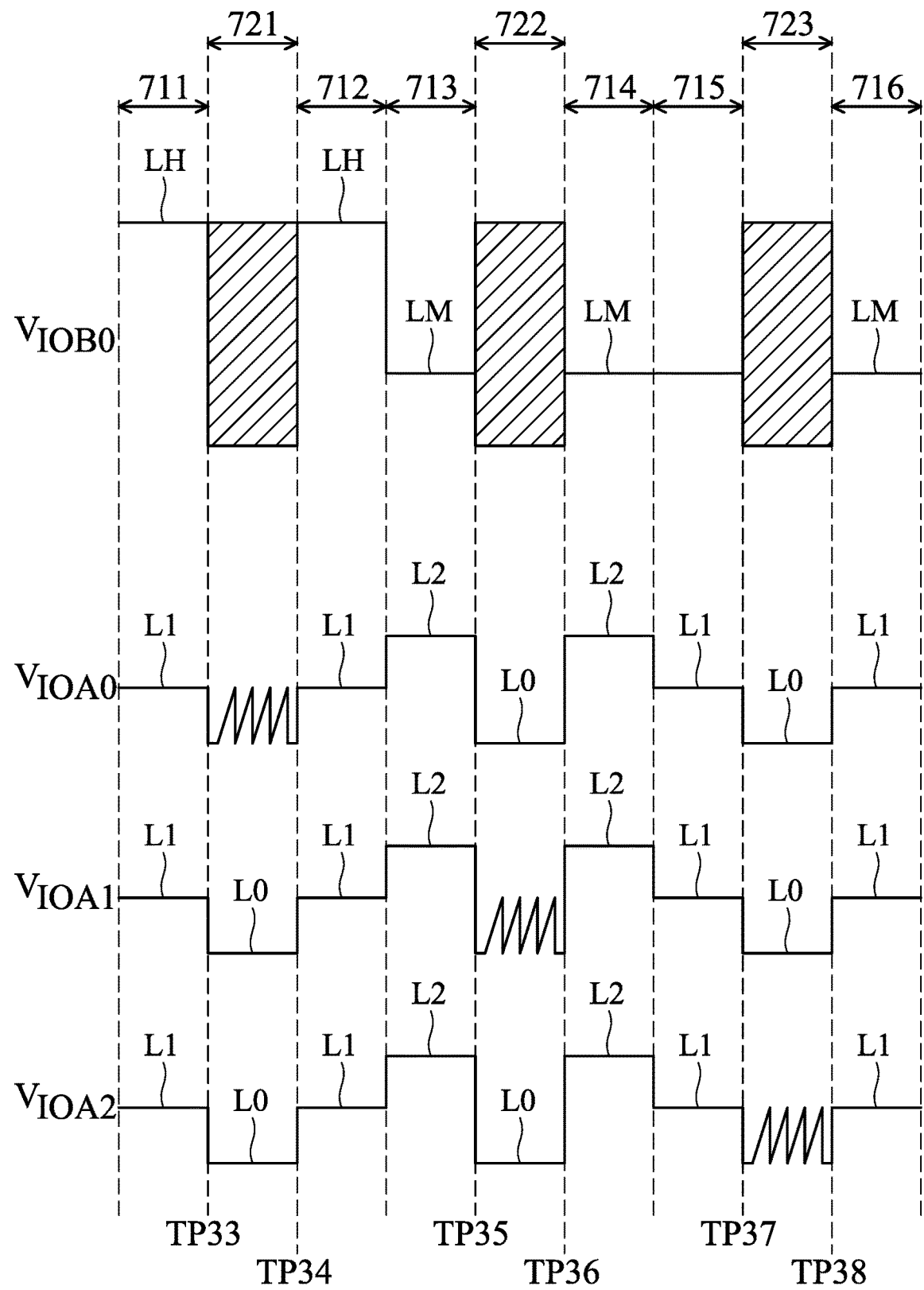
FIGS. 7A~7C are schematic diagrams of the variations of the voltage levels of a first pin group and a second pin group.
Figure 7B:
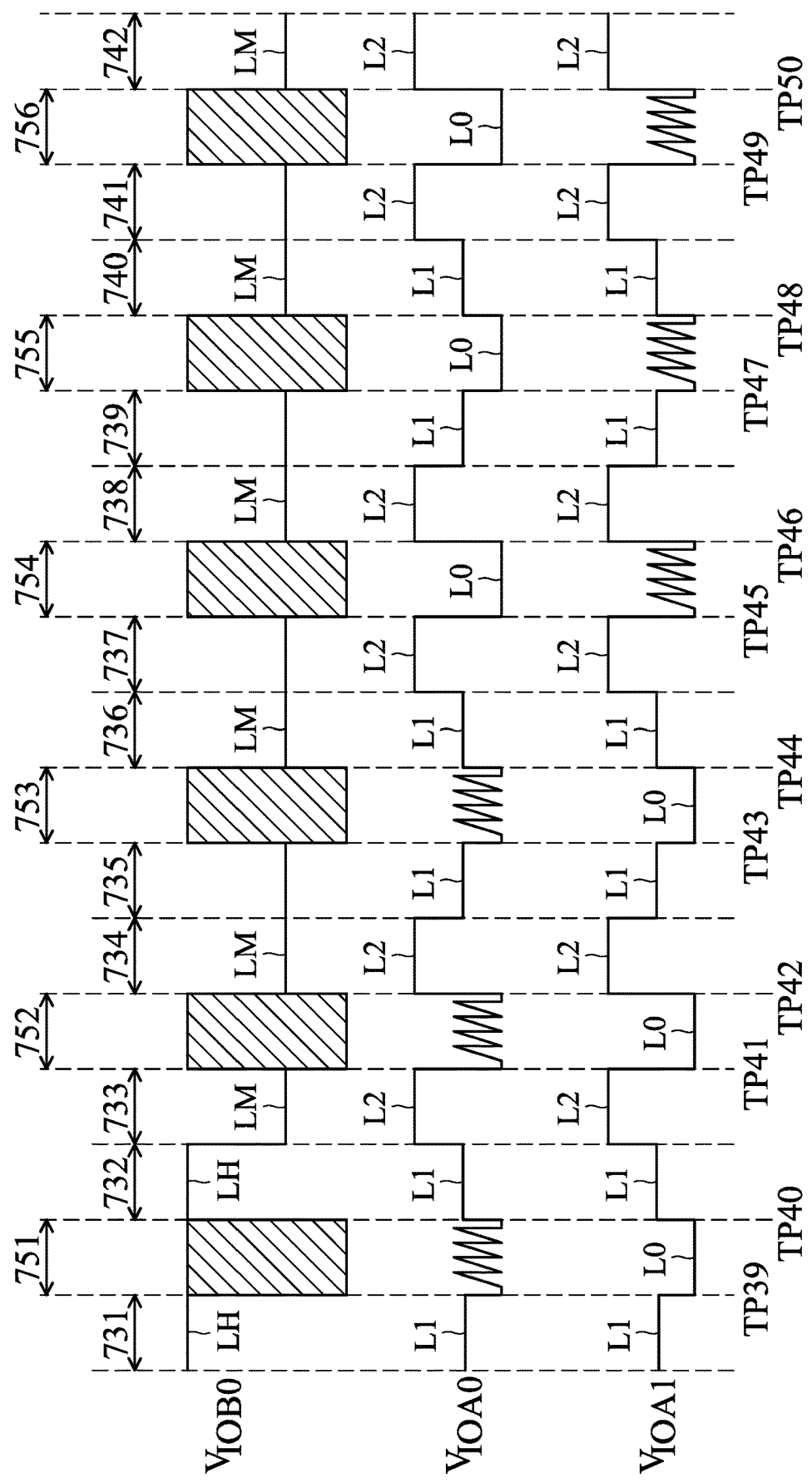
Figure 7C:
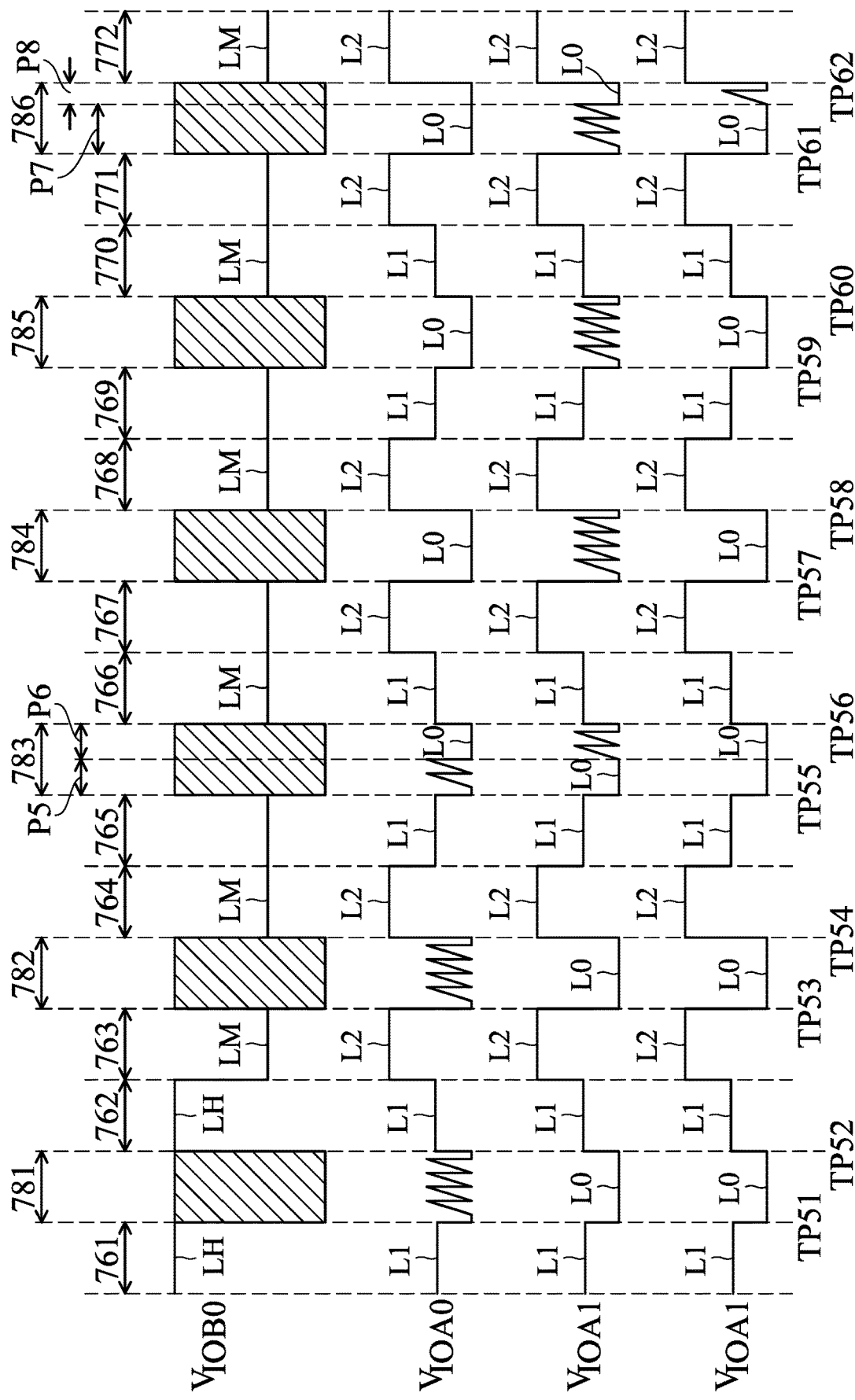

FIGS. 7A~7C are schematic diagrams of the variations of the voltage levels of a first pin group and a second pin group. Since the variations of the voltage levels of the input-output pins IOB0~IOB3 are the same, only the variation of the voltage level $V_{IOB0}$ of the input-output pin IOB0 is shown in FIGS. 7A~7C. Furthermore, since the variations of the voltage levels of the input-output pins IOA0~IOA3 are the same, only the variation of the voltage levels $V_{IOA0}$~$V_{IOA2}$ of the input-output pins IOA0~IOA2 is shown in FIGS. 7A~7C.

Refer to FIG. 7A, in the display periods 711 and 712, the control circuit 630 sets the voltage level $V_{IOB0}$ to the level LH and sets the voltage levels $V_{IOA0}$~$V_{IOA2}$ to the level L1. In other embodiments, control circuit 630 may set the voltage levels $V_{IOB0}$, and $V_{IOA0}$~$V_{IOA2}$ to different levels in the display periods 711 and 712. The display device 610 displays an image according to the voltage levels $V_{IOB0}$, and $V_{IOA0}$~$V_{IOA2}$.

In the sensing period 721, the control circuit 630 sets the voltage level $V_{IOB0}$ of the input-output pin IOB0 (first pin group) to a floating level. In one embodiment, the control circuit 630 does not provide any voltage to the input-output pin IOB0. In such cases, the impedance of the input-output pin IOB0 is a high impedance. Therefore, the voltage level $V_{IOB0}$ is a floating level. In the sensing period 721, the control circuit 630 performs the sensing operation for the input-output pin IOA0. The control circuit 630 does not perform the sensing operation for each of the input-output pins IOA1 and IOA2. In one embodiment, the control circuit 630 may set the voltage levels $V_{IOA1}$ and $V_{IOA2}$ to the level L0.

In the display periods 713 and 714, the control circuit 630 sets the voltage level $V_{IOB0}$ to the level LM and sets the voltage levels $V_{IOA0}$~$V_{IOA2}$ to the level L2. In other embodiments, control circuit 630 may set the voltage levels $V_{IOB0}$, and $V_{IOA0} \sim V_{IOA2}$ to different levels in the display periods 713 and 714. The display device 610 displays an image according to the voltage levels $V_{IOB0}$ and $V_{IOA0} \sim V_{IOA2}$ in the display periods 713 and 714.

In the sensing period 722, the control circuit 630 sets the voltage level $V_{IOB0}$ to a floating level. At this time, the control circuit 630 performs the sensing operation for the input-output pin IOA1. The control circuit 630 does not perform the sensing operation for the input-output pins IOA0 and IOA2. In one embodiment, the control circuit 630 sets the voltage levels $V_{IOA0}$ and $V_{IOA2}$ to the level L0.

In the display periods 715 and 716, the control circuit 630 sets the voltage level $V_{IOB0}$ to the level LM and sets the voltage levels $V_{IOA0} \sim V_{IOA2}$ to the level L1. In other embodiments, control circuit 630 may set the voltage levels $V_{IOB0}$, and $V_{IOA0} \sim V_{IOA2}$ to different levels in the display periods 715 and 716. The display device 610 displays an image according to the voltage levels $V_{IOB0}$ and $V_{IOA0} \sim V_{IOA2}$ in the display periods 715 and 716. In other embodiments, control circuit 630 may set the voltage level $V_{IOB0}$ to a high level or a low level in the sensing periods 721~723. In such cases, the display device 610 may be a PM LED display device.

In the sensing period 723, the control circuit 630 sets the voltage level $V_{IOB0}$ to a floating level. At this time, the control circuit 630 performs the sensing operation for the input-output pin IOA2. The control circuit 630 does not perform the sensing operation for the input-output pins IOA0 and IOA1. In one embodiment, the control circuit 630 sets the voltage levels $V_{IOA0}$ and $V_{IOA1}$ to the level L0.

In one embodiment, the sensing period 721 is specified by the end time point TP33 of the display period 711 and the start time point TP34 of the display period 712. The sensing period 722 is specified by the end time point TP35 of the display period 713 and the start time point TP36 of the display period 714. The sensing period 723 is specified by the end time point TP37 of the display period 715 and the start time point TP38 of the display period 716. In each of the sensing period 721~723, the control circuit 630 only performs the sensing operation for one pin of the first pin group and sets the voltage level of the second pin group to a first predetermined level. After the control circuit 630 performs the sensing operation for all pins of the first pin group, the control circuit 630 performs the sensing operation for each pin of the second pin group and sets the voltage level of the first pin group to a second predetermined level.

Refer to FIG. 7B, in the display periods 731 and 732, the control circuit 630 sets the voltage level $V_{IOB0}$ to the level LH and sets the voltage levels $V_{IOA0}$ and $V_{IOA1}$ to the level L1. Therefore, the display device 610 displays a corresponding image according to the voltage levels $V_{IOB0}$, $V_{IOA0}$ and $V_{IOA1}$. In one embodiment, the control circuit 630 stops setting the voltage level $V_{IOB0}$ to the level LH in the end time point TP39 of the display period 731. The control circuit 630 starts setting the voltage level $V_{IOB0}$ to the level LH in the start time point TP40 of the display period 732. The sensing period 751 is specified by the end time point TP39 and the start time point TP40. From end time point TP39 to the start time point TP40, the control circuit 630 sets the voltage level $V_{IOB0}$ to a floating level. From end time point TP39 to the start time point TP40 the control circuit 630 performs the sensing operation for the input-output pin IOA0 and does not perform the sensing operation for the input-output pin IOA1. The control circuit 630 may set the voltage $V_{IOA1}$ to the level L0.

In the display periods 733 and 734, the control circuit 630 sets the voltage level $V_{IOB0}$ to the level LM and sets the voltage levels $V_{IOA0}$ and $V_{IOA1}$ to the level L2. In other embodiments, the control circuit 630 may set the voltage levels $V_{IOB0}$, $V_{IOA0}$ and $V_{IOA1}$ to different levels. In one embodiment, the control circuit 630 stops setting the voltage level $V_{IOB0}$ to the level LM in the end time point TP41 of the display period 733. The control circuit 630 starts setting the voltage level $V_{IOB0}$ to the level LM in the start time point TP42 of the display period 734. The sensing period 752 is specified by the end time point TP41 and the start time point TP42. From end time point TP41 to the start time point TP42, the control circuit 630 sets the voltage level $V_{IOB0}$ to a floating level. From end time point TP41 to the start time point TP42, the control circuit 630 performs the sensing operation for the input-Output pin IOA0 and does not perform the sensing operation for the input-output pin IOA1. The control circuit 630 may set the voltage level $V_{IOA1}$ to the level L0.

In the display periods 735 and 736, the control circuit 630 sets the voltage level $V_{IOB0}$ to the level LM and sets the voltage levels $V_{IOA0}$ and $V_{IOA1}$ to the level L1. In other embodiments, the control circuit 630 may set the voltage levels $V_{IOB0}$, $V_{IOA0}$ and $V_{IOA1}$ to different levels. In one embodiment, the control circuit 630 stops setting the voltage level $V_{IOB0}$ to the level LM in the end time point TP43 of the display period 735. The control circuit 630 starts setting the voltage level $V_{IOB0}$ to the level LM in the start time point TP44 of the display period 736. The sensing period 753 is specified by the end time point TP43 and the start time point TP44. From end time point TP43 to the start time point TP44, the control circuit 630 sets the voltage level $V_{IOB0}$ to a floating level. From end time point TP43 to the start time point TP44, the control circuit 630 performs the sensing operation for the input-output pin IOA0 and does not perform the sensing operation for the input-output pin IOA1. The control circuit 630 may set the voltage level $V_{IOA1}$ to the level L0.

In the display periods 737 and 738, the control circuit 630 sets the voltage level $V_{IOB0}$ to the level LM and sets the voltage levels $V_{IOA0}$ and $V_{IOA1}$ to the level L2. In other embodiments, the control circuit 630 may set the voltage levels $V_{IOB0}$, $V_{IOA0}$ and $V_{IOA1}$ to different levels. In one embodiment, the control circuit 630 stops setting the voltage level $V_{IOB0}$ to the level LM in the end time point TP45 of the display period 737. The control circuit 630 starts setting the voltage level $V_{IOB0}$ to the level LM in the start time point TP46 of the display period 738. The sensing period 754 is specified by the end time point TP45 and the start time point TP46. From end time point TP45 to the start time point TP46, the control circuit 630 sets the voltage level $V_{IOB0}$ to a floating level. From end time point TP45 to the start time point TP46, the control circuit 630 performs the sensing operation for the input-output pin IOA1 and does not perform the sensing operation for the input-output pin IOA0. The control circuit 630 may set the voltage level $V_{IOA0}$ to the level L0.

In the display periods 739 and 740, the control circuit 630 sets the voltage level $V_{IOB0}$ to the level LM and sets the voltage levels $V_{IOA0}$ and $V_{IOA1}$ to the level L1. In other embodiments, the control circuit 630 may set the voltage levels $V_{IOB0}$, $V_{IOA0}$ and $V_{IOA1}$ to different levels. In one embodiment, the control circuit 630 stops setting the voltage level $V_{IOB0}$ to the level LM in the end time point TP47 of the display period 739. The control circuit 630 starts setting the voltage level $V_{IOB0}$ to the level LM in the start time point TP48 of the display period 740. The sensing period 755 is specified by the end time point TP47 and the start time point TP48. From end time point TP47 to the start time point TP48, the control circuit 630 sets the voltage level $V_{IOB0}$ to a floating level. From end time point TP47 to the start time point TP48, the control circuit 630 performs the sensing operation for the input-output pin IOA1 and does not perform the sensing operation for the input-output pin IOA0. The control circuit 630 may set the voltage level $V_{IOA0}$ to the level L0.

In the display periods 741 and 742, the control circuit 630 sets the voltage level $V_{IOB0}$ to the level LM and sets the voltage levels $V_{IOA0}$ and $V_{IOA1}$ to the level L2. In other embodiments, the control circuit 630 may set the voltage levels $V_{IOB0}$, $V_{IOA0}$ and $V_{IOA1}$ to different levels. In one embodiment, the control circuit 630 stops setting the voltage level $V_{IOB0}$ to the level LM in the end time point TP49 of the display period 741. The control circuit 630 starts setting the voltage level $V_{IOB0}$ to the level LM in the start time point TP50 of the display period 742. The sensing period 756 is specified by the end time point TP49 and the start time point TP50. From end time point TP49 to the start time point TP50, the control circuit 630 sets the voltage level $V_{IOB0}$ to a floating level. In this embodiment, from end time point TP49 to the start time point TP50, the control circuit 630 performs the sensing operation for the input-output pin TOM and does not perform the sensing operation for the input-output pin IOA0. The control circuit 630 may set the voltage level $V_{IOA0}$ to the level L0. In other embodiments, control circuit 630 may set the voltage level $V_{IOB0}$ to a high level or a low level in the sensing periods 751~756.

Refer to FIG. 7C, in the display periods 761 and 762, the control circuit 630 sets the voltage level $V_{IOB0}$ to the level LH and sets the voltage levels $V_{IOA0}$~$V_{IOA2}$ to the level L1. Therefore, the display device 610 displays a corresponding image according to the voltage levels $V_{IOB0}$ and $V_{IOA0}$~$V_{IOA2}$. In the sensing period 781, the control circuit 630 performs the sensing operation for the input-output pin IOA0. The control circuit 630 does not perform the sensing operation for the input-output pins IOA1 and IOA2. In such cases, the control circuit 630 sets the voltage levels $V_{IOA1}$ and $V_{IOA2}$ to the level L0. The sensing period 781 is specified by the end time point TP51 of the display period 761 and the start time point TP52 of the display period 762. The control circuit 630 stops setting the voltage level $V_{IOB0}$ to the level LH and starts setting the voltage level $V_{IOB0}$ to the level LH. In one embodiment, the control circuit 630 sets the voltage level $V_{IOB0}$ to a floating level. From the end time point TP51 to the start time point TP52, the control circuit 630 performs the sensing operation for the input-output pin IOA0 and does not perform the sensing operation for the input-output pins IOA1 and IOA2. The control circuit 630 may set the voltage levels $V_{IOA1}$ and $V_{IOA2}$ to the level L0.

In the display periods 763 and 764, the control circuit 630 sets the voltage level $V_{IOB0}$ to the level LM and sets the voltage levels $V_{IOA0}$~$V_{IOA2}$ to the level L2. In other embodiments, the control circuit 630 may set the voltage levels $V_{IOB0}$ and $V_{IOA0}$~$V_{IOA2}$ to different levels. In one embodiment, the control circuit 630 stops setting the voltage level $V_{IOB0}$ to the level LM in the end time point TP53 of the display period 763. The control circuit 630 starts setting the voltage level $V_{IOB0}$ to the level LM in the start time point TP54 of the display period 764. The sensing period 782 is specified by the end time point TP53 and the start time point TP54. From end time point TP53 to the start time point TP54, the control circuit 630 sets the voltage level $V_{IOB0}$ to a floating level. In this embodiment, from end time point TP53 to the start time point TP54, the control circuit 630 performs the sensing operation for the input-output pin IOA0 and does not perform the sensing operation for the input-output pins IOA1 and IOA2. The control circuit 630 may set the voltage level $V_{IOA1}$ and $V_{IOA2}$ to the level L0. In other embodiments, control circuit 630 may set the voltage level $V_{IOB0}$ to a high level or a low level in the sensing period 782.

In the display periods 765 and 766, the control circuit 630 sets the voltage level $V_{IOB0}$ to the level LM and sets the voltage levels $V_{IOA0}$~$V_{IOA2}$ to the level L1. In other embodiments, the control circuit 630 may set the voltage levels $V_{IOB0}$ and $V_{IOA0}$~$V_{IOA2}$ to different levels. In one embodiment, the control circuit 630 stops setting the voltage level $V_{IOB0}$ to the level LM in the end time point TP55 of the display period 765. The control circuit 630 starts setting the voltage level $V_{IOB0}$ to the level LM in the start time point TP56 of the display period 766. The sensing period 782 is specified by the end time point TP55 and the start time point TP56. From end time point TP55 to the start time point TP56, the control circuit 630 sets the voltage level $V_{IOB0}$ to a floating level. In this embodiment, from end time point TP55 to the start time point TP56, the control circuit 630 performs the sensing operation for the input-output pin IOA0 or IOA1 and does not perform the sensing operation for the input-output pin IOA2. In this embodiment, sensing period 783 comprises periods P5 and P6. In the period P5, the control circuit 630 performs the sensing operation for the input-output pin IOA0. The control circuit 630 does not perform the sensing operation for the input-output pins IOA1 and IOA2. The control circuit 630 may set the voltage levels $V_{IOA1}$ and $V_{IOA2}$ to the level L0. In the period P6, the control circuit 630 performs the sensing operation for the input-output pin IOA1. The control circuit 630 does not perform the sensing operation for the input-output pins IOA0 and IOA2. The control circuit 630 may set the voltage levels $V_{IOA0}$ and $V_{IOA2}$ to the level L0.

In the display periods 767 and 768, the control circuit 630 sets the voltage level $V_{IOB0}$ to the level LM and sets the voltage levels $V_{IOA0}$~$V_{IOA2}$ to the level L2. In other embodiments, the control circuit 630 may set the voltage levels $V_{IOB0}$ and $V_{IOA0}$~$V_{IOA2}$ to different levels. In one embodiment, the control circuit 630 stops setting the voltage level $V_{IOB0}$ to the level LM in the end time point TP57 of the display period 767. The control circuit 630 starts setting the voltage level $V_{IOB0}$ to the level LM in the start time point TP58 of the display period 768. The sensing period 784 is specified by the end time point TP57 and the start time point TP58. From end time point TP57 to the start time point TP58, the control circuit 630 sets the voltage level $V_{IOB0}$ to a floating level. In this embodiment, from end time point TP57 to the start time point TP58, the control circuit 630 performs the sensing operation for the input-output pin IOA1 and does not perform the sensing operation for the input-output pins IOA0 and IOA2. The control circuit 630 may set the voltage level $V_{IOA0}$ and $V_{IOA2}$ to the level L0. In other embodiments, control circuit 630 may set the voltage level $V_{IOB0}$ to a high level or a low level in the sensing period 784.

In the display periods 769 and 770, the control circuit 630 sets the voltage level $V_{IOB0}$ to the level LM and sets the voltage levels $V_{IOA0}$~$V_{IOA2}$ to the level L1. In other embodiments, the control circuit 630 may set the voltage levels $V_{IOB0}$ and $V_{IOA0}$~$V_{IOA2}$ to different levels. In one embodiment, the control circuit 630 stops setting the voltage level $V_{IOB0}$ to the level LM in the end time point TP59 of the display period 769. The control circuit 630 starts setting the voltage level $V_{IOB0}$ to the level LM in the start time point TP60 of the display period 770. The sensing period 785 is specified by the end time point TP59 and the start time point TP60. From end time point TP59 to the start time point TP60, the control circuit 630 sets the voltage level $V_{IOB0}$ to a floating level. In this embodiment, from end time point TP59 to the start time point TP60, the control circuit 630 performs the sensing operation for the input-output pin IOA1 and does not perform the sensing operation for the input-output pins IOA0 and IOA2. The control circuit 630 may set the voltage level $V_{IOA0}$ and $V_{IOA2}$ to the level L0. In other embodiments, control circuit 630 may set the voltage level $V_{IOB0}$ to a high level or a low level in the sensing period 785.

In the display periods 771 and 772, the control circuit 630 sets the voltage level $V_{IOB0}$ to the level LM and sets the voltage levels $V_{IOA0}$~$V_{IOA2}$ to the level in other embodiments, the control circuit 630 may set the voltage levels $V_{IOB0}$ and $V_{IOA0}$~$V_{IOA2}$ to different levels. In one embodiment, the control circuit 630 stops setting the voltage level $V_{IOB0}$ to the level LM in the end time point TP61 of the display period 771. The control circuit 630 starts setting the voltage level $V_{IOB0}$ to the level LM in the start time point TP62 of the display period 772. The sensing period 786 is specified by the end time point TP61 and the start time point TP62. From end time point TP61 to the start time point TP62, the control circuit 630 sets the voltage level $V_{IOB0}$ to a floating level. In other embodiments, control circuit 630 may set the voltage level $V_{IOB0}$ to a high level or a low level in the sensing period 786. From end time point TP61 to the start time point TP62, the control circuit 630 performs the sensing operation for the input-output pin IOA1 or IOA2 and does not perform the sensing operation for the input-output pin IOA0. In this embodiment, the sensing period 783 comprises periods P7 and P8. In the period P7, the control circuit 630 performs the sensing operation for the input-output pin IOA1. At this time, the control circuit 630 does not perform the sensing operation for the input-output pins IOA0 and IOA2. The control circuit 630 may set the voltage levels $V_{IOA0}$ and $V_{IOA2}$ to the level L0. In the period P8, the control circuit 630 performs the sensing operation for the input-output pin IOA2. In this period, the control circuit 630 does not perform the sensing operation for the input-output pins IOA0 and IOA1. The control circuit 630 may set the voltage levels $V_{IOA0}$ and $V_{IOA1}$ to the level L0.

After the control circuit 630 performs the sensing operation for all of the input-output pins IOA0-IOA3, the control circuit 630 performs the sensing operation for each of the input-output pins IOB0~IOB3. In such cases, when the control circuit 630 performs the sensing operation for the input-output pin IOB0~IOB3, the control circuit 630 sets the voltage levels of the input-output pins IOA0~IOA3 to a floating level, a high level or a low level.

Figure 8:
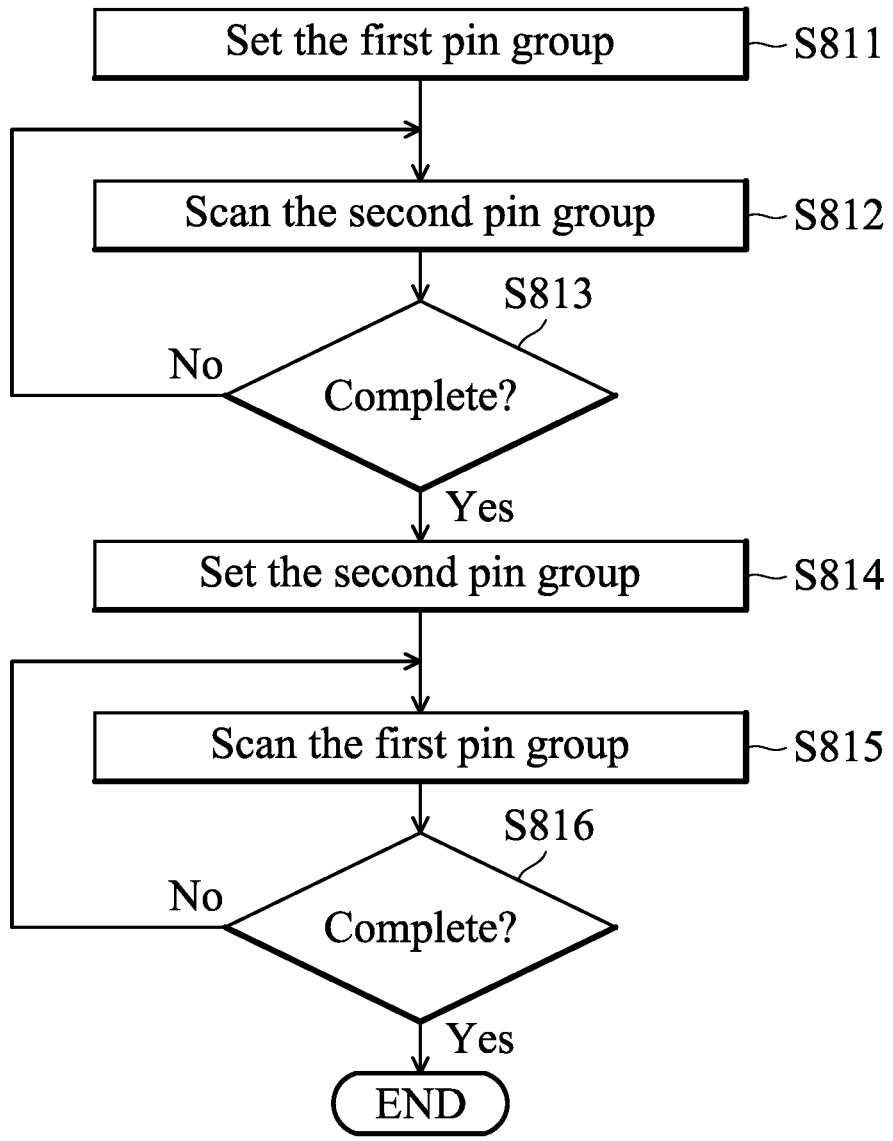
FIG. 8 is a flowchart of an exemplary embodiment of a sensing operation performed by the control circuit 630 according to various aspects of the present disclosure.

FIG. 8 is a flowchart of an exemplary embodiment of a sensing operation performed by the control circuit 630 according to various aspects of the present disclosure. First, the voltage level of each pin of the first pin group is set to a first predetermined level (step S811). Then, the voltage level of each pin of the second pin group is scanned (step S812). In one embodiment, the control circuit 630 performs a sensing operation for the second pin group. The control circuit 630 performs the sensing operation for one pin of the second pin group and does not perform the sensing operation for the other pins of the second pin group between two display periods.

Next, a determination is made as to whether the control circuit 630 performs the sensing operation for all pins in the second pin group (step S813). If the outcome of step S813 is false then step S812 may be performed, else step S814 may be performed. In step S814, the voltage level of each pin of the second pin group is set to a second predetermined level. Then, the voltage level of each pin of the first pin group is scanned (step S815). In one embodiment, the control circuit 630 performs the sensing operation for the first pin group. The control circuit 630 performs the sensing operation for one pin of the first pin group and does not perform the sensing operation for the other pins of the first pin group between two display periods.

Next, a determination is made as to whether the voltage levels of all pins in the first pin group have been scanned (step S816). If the outcome of step S816 is false then step S815 may be performed, else the sensing operation is finished.

In one embodiment, the second predetermined level in step S814 is opposite to the first predetermined level in step S811. For example, when the first predetermined level is a high level, the second predetermined level is a low level. When the first predetermined level is a low level, the second predetermined level is a high level. In some embodiments, each of the first predetermined level in step S811 and the second predetermined level in step S814 is a floating level. In such cases, step S811 does not provide any voltage to the first pin group, and step S814 does not provide any voltage to the second pin group.

In other embodiments, steps S814~S816 are performed before than step S811. In such cases, the control circuit 630 sets the voltage level of each pin of the second pin group to the second predetermined level and then performs the sensing operation for the first pin group. After the sensing operation is performed for all pins of the first pin group, the control circuit 630 sets the voltage level of each pin of the first pin group to the first predetermined level and then performs the sensing operation for the second pin group.

Figure 9A:
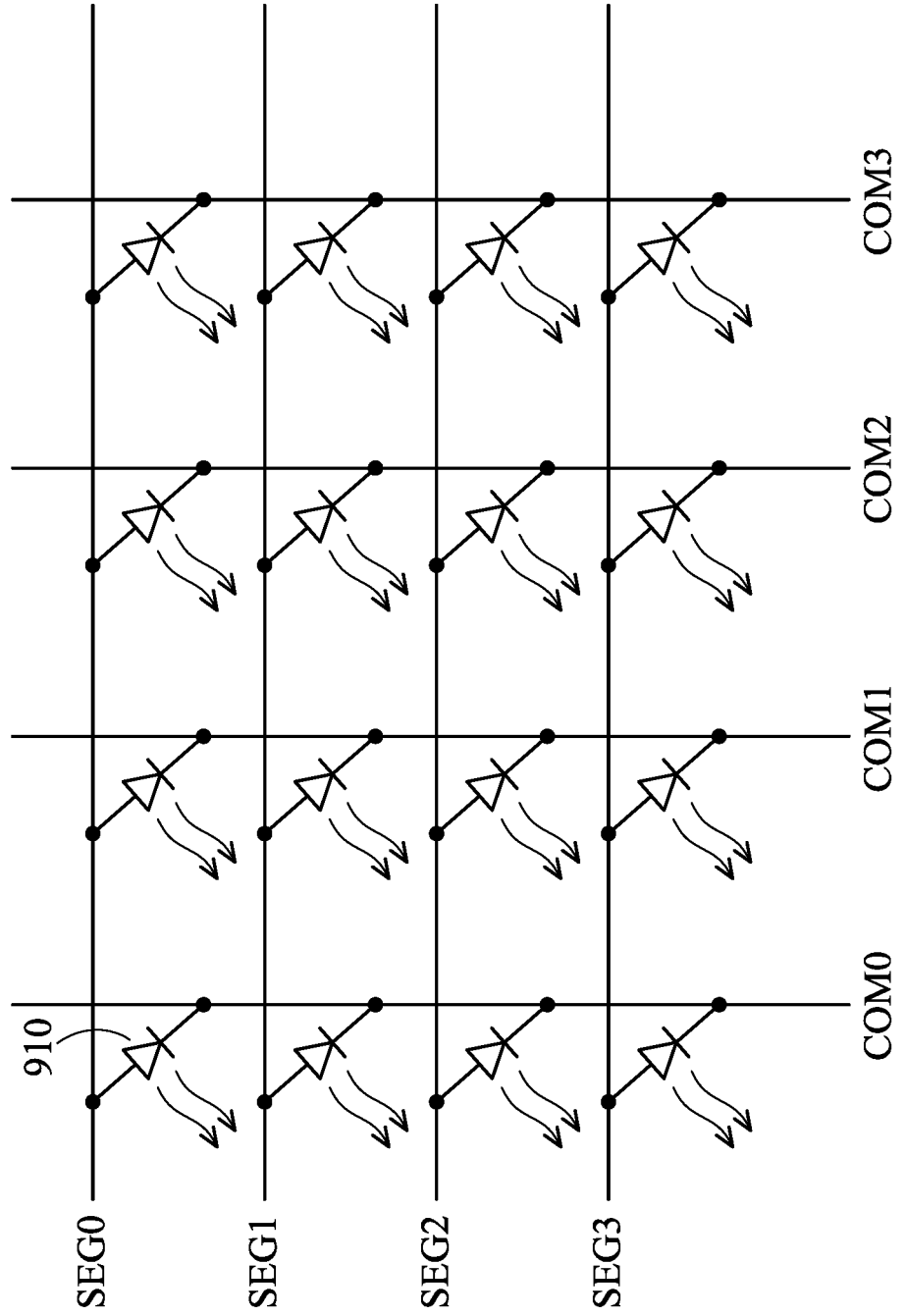
FIG. 9A is a schematic diagram of an exemplary embodiment of a display area according to various aspects of the present disclosure.

FIG. 9A is a schematic diagram of an exemplary embodiment of a display area according to various aspects of the present disclosure. In this case, the display area 900A comprises a plurality of LEDs. Each LED is coupled to one of the input pins SEG0~SEG3 and one of the input pins COM0~COM3. Taking the LED 910 as an example, the cathode of the LED 910 is coupled to the input pin SEG0. The anode of the LED 910 is coupled to the input pin COM0. In this case, when the voltage difference between the input pins SEG0 and COM0 is larger than a turn-on voltage of the LED 910, the LED 910 is activated. When the voltage difference between the input pins SEG0 and COM0 is not larger than the turn-on on voltage of the LED 910, the LED 910 is deactivated.

In the sensing period, since the voltage levels of the input pins COM0~COM3 may be a high level (referred to as a second predetermined level), even if the input pins SEG0~SEG3 receive small voltage levels, the LED 910 is not turned on. Additionally, since the voltage levels of the input pins SEG0~SEG3 may be a low level (referred to as a first predetermined level), even if the input pins COM0~COM3 receive small voltage levels, the LED 910 is not turned on. Therefore, when the control circuit 630 performs a sensing operation for the capacitive touch device 620 in the sensing period, the display device 610 is not interfered by the sensing operation.

Figure 9B:
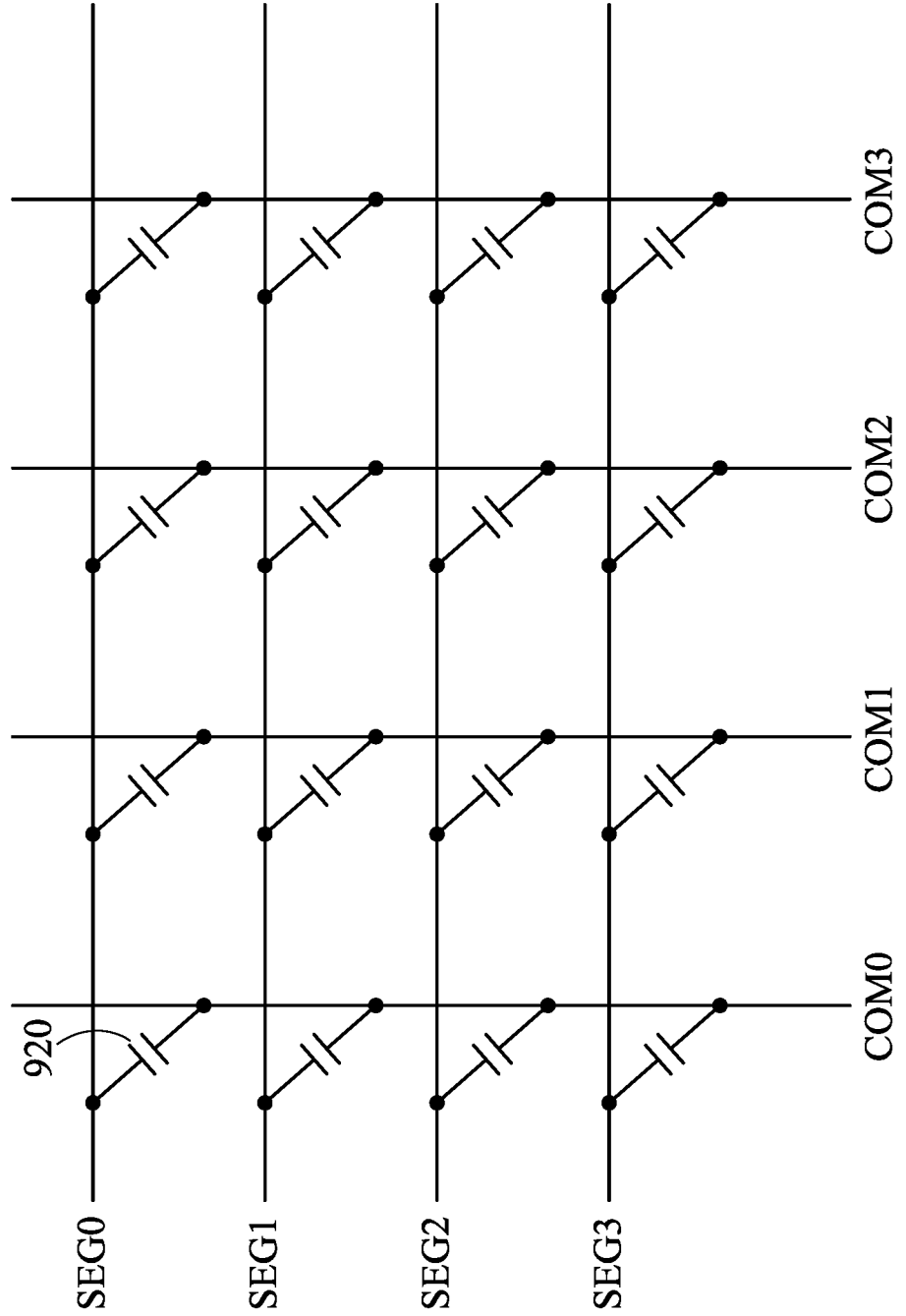
FIG. 9B is a schematic diagram of another exemplary embodiment of the display area according to various aspects of the present disclosure.

FIG. 9B is a schematic diagram of another exemplary embodiment of the display area according to various aspects of the present disclosure. In this embodiment, the display area 900B comprises a plurality of liquid-crystal capacitors. Each of the liquid-crystal capacitor is coupled to one of the input pins SEG0~SEG3 and one of the input pins COM0~COM3. Taking the liquid-crystal capacitor 920 as an example, the liquid-crystal capacitor 920 is coupled between the input pins SEG0 and COM0.

In the sensing period, since the voltage levels of the input pins COM0~COM3 may be a floating level, even if the input pins SEG0~SEG3 receive small voltage levels, the liquid-crystal capacitor 920 does not be charged. Additionally, since the voltage levels of the input pins SEG0~SEG3 may be a floating level, even if the input pins COM0~COM3 receive small voltage levels, the liquid-crystal capacitor 920 does not be charged. Therefore, when the control circuit 630 performs a sensing operation for the capacitive touch device 620 in the sensing period, the display device 610 is not interfered by the sensing operation.

Figure 10:
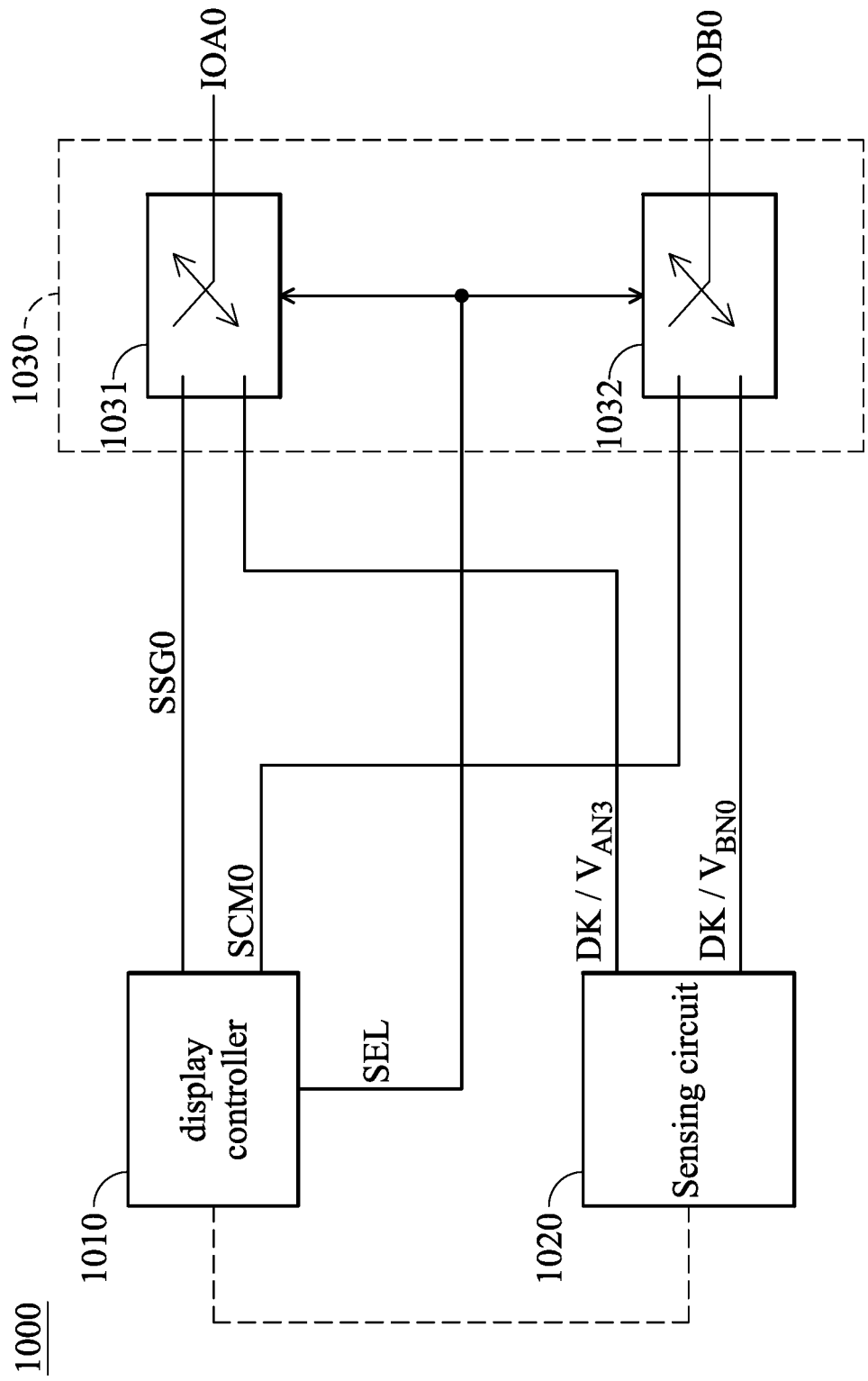
FIG. 10 is a schematic diagram of another exemplary embodiment of the control circuit according to various aspects of the present disclosure.

FIG. 10 is a schematic diagram of another exemplary embodiment of the control circuit according to various aspects of the present disclosure. The control circuit 1000 comprises a display controller 1010, a sensing circuit 1020, and a transmission circuit 1030. The display controller 1010 is configured to provide the driving signals SSG0 and SCM0, and a switching signal SEL. In one embodiment, the driving signal SSG0 is a segment signal, and the driving signal SCM0 is a common signal. In other embodiments, the display controller 1010 combines the image driver 131 and the microcontroller circuit 132 of FIG. 1. In such cases, the driving signal SSG0 serves as one of the driving signals SD1~SD4, and the driving signal SCM0 serves as another of the driving signals SD1~SD4.

The sensing circuit 1020 performs a sensing operation. In the sensing operation, the sensing circuit 1020 provides the reference voltage DK and receives the sensing voltages $V_{AN3}$ and $V_{BN0}$. In one embodiment, the sensing voltage $V_{AN3}$ is the voltage of the sensing pin AN3 of the capacitive touch device 620, and the sensing voltage $V_{BN0}$ is the voltage of the sensing pin BN0 of the capacitive touch device 620. In other embodiments, the sensing circuit 1020 receives fewer sensing voltages or more sensing voltages, such as the voltages of the sensing pins AN0~AN2 and BN1~BN3. Since the feature of sensing circuit 1020 is the same as the feature of sensing circuit 133 of FIG. 1, the description of the feature of sensing circuit 1020 is omitted.

The transmission circuit 1030 selects the output of the display controller 1010 or the sensing circuit 1020 and transmits the output of the display controller 1010 or the sensing circuit 1020 to the input-output pins IOA0 and IOB0 according to the switching signal SEL. In one embodiment, the transmission circuit 1030 provides the driving signals SSG0 and SCM0 to the input-output pins IOA0 and IOB0 according to the switching signal SE in a display period. In a sensing period, the transmission circuit 1030 provides the reference voltage DK to one of the input-output pins IOA0 and IOB0 and sets the level of the other of the input-output pins IOA0 and IOB0 according to the switching signal SEL.

Assuming that the input-output pin IOA0 belongs to a first pin group, and the input-output pin IOB0 belongs to a second pin group, in a first sensing period, the display controller 1010 directs the transmission circuit 1030 to transmit the reference voltage DK to the input-output pin IOA0 and to transmit the driving signal SCM0 to the input-output pin IOB0. At this time, the driving signal SCM0 is a first predetermined level. In other embodiments, the display controller 1010 directs the transmission circuit 1030 to stop transmitting airy signals to the input-output pin IOB0. In such cases, the voltage level of the input-output pin IOB0 is a floating level. In some embodiments, when the transmission circuit 1030 transmits the reference voltage DK to the input-output pin IOA0, the sensing circuit 1020 may provide a first predetermined level, such as a low level or a high level. In such cases, the transmission circuit 1030 may transmit the first predetermined level provided by the sensing circuit 1020 to the input-output pin IOB0.

In a second sensing period, the display controller 1010 directs the transmission circuit 1030 to transmit the reference voltage DK to the input-output pin IOB0 and transmit the driving signal SSG0 to the input-output pin IOA0. At this time, the driving signal SSG0 is a second predetermined level. In other embodiments, the display controller 1010 directs the transmission circuit 1030 to stop transmitting any signals to the input-output pin IOA0. In such cases, the voltage level of the input-output pin IOA0 is a floating level. In some embodiments, when the transmission circuit 1030 transmits the reference voltage DK to the input-output pin IOB0, the sensing circuit 1020 may provide a second predetermined level, such as a high level or a low level. In such cases, the transmission circuit 1030 may transmit the second predetermined level provided by the sensing circuit 1020 to the input-output pin IOA0.

After the transmission circuit 1030 provides the reference voltage DK to the input-output pin IOA0, the sensing circuit 1020 detects the voltage $V_{AN3}$ of the input-output pin IOA0. In such cases, when the voltage $V_{AN3}$ of the input-output pin IOA0 is not equal to the reference voltage DK, it means that a sensing area corresponding to the sensing pin AN3 of the capacitive touch device 620 is touched. Therefore, the sensing circuit 1020 informs the display controller 1010 such that the display controller 1010 performs a corresponding operation.

Similarly, after the transmission circuit 1030 provides the reference voltage DK to the input-output pin IOB0, the sensing circuit 1020 detects the voltage $V_{BN0}$ of the input-output pin IOB0. In such cases, when the voltages $V_{BN0}$ of the input-output pin IOB0 is not equal to the reference voltage DK, it means that a sensing area corresponding to the sensing pin BN0 of the capacitive touch device 620 is touched. Therefore, the sensing circuit 1020 informs the display controller 1010 such that the display controller 1010 performs another corresponding operation.

Before detecting the voltage of the input-output pin IOA0 or IOB0, the sensing circuit 1020 provides the reference voltage DK to the input-output pin IOA0 or IOB0. Therefore, the sensing operation performed by the sensing circuit 1020 is not to be interfered easily by noise.

For brevity, only the input-output pins IOA0 and IOB0 are shown in FIG. 10, but the disclosure is not limited thereto. In other embodiments, the transmission circuit 1030 may be coupled to more input-output pins, such as IOA1~IOA3, IOB1~IOB3. The structure of transmission circuit 1030 is not limited in the present disclosure. In one embodiment, the transmission circuit 1030 comprises switching circuits 1031 and 1032. The switching circuits 1031 and 1032 may transmit the corresponding signals according to the switching signal SEL. In other embodiments, the display controller 1010 provides two switching signals to control the switching circuits 1031 and 1032.

In other embodiments, before the sensing circuit 1020 performs a sensing operation to detect whether the capacitive touch device 620 is touched, the sensing circuit 1020 may send a request signal (not shown) to the display controller 1010. The display controller 1010 replies to the sensing circuit 1020 and sends a grant signal to the sensing circuit 1020. In a specific period, the sensing circuit 1020 is capable of controlling the voltage levels of the input-output pins IOA0 and IOB0. After the specific period, the voltage levels of the input-Output pins IOA0 and IOB0 are controlled by the display device 910.

In a sensing period, the control circuit 1000 performs a sensing operation for a portion of the input-output pins and set the other portion of the input-output pins to a predetermined level (e.g., a low level or a high level) or a floating level. The control circuit 1000 performs the sensing operation in a sensing period between two display periods. In the same sensing period, the control circuit 1000 may perform the sensing operation for a single input-output pin. Therefore, the display device 610 is not interfered with the sensing operation performed by the control circuit 1000 in the sensing period.

Additionally, the display device 610 may be a PM display device. Since the reaction speed of the PM display device is slow, even if the potentials of the input-output pins are changed, the PM display device will not respond immediately. Therefore, even if the input-output pins are set to a reference voltage, the display device 610 does not be interfered by the reference voltage. In other embodiments, even if the display device 610 is an AM display device, since the reference voltage is less than the level of the driving signal, the display device 610 does not be interfered by the reference voltage. In some embodiments, the duration of the sensing period is less than the duration of the display period, the display device 610 is not interfered by the sensing operation.

Unless otherwise defined, all terms (including technical and scientific terms) used herein have the same meaning as commonly understood by one of ordinary skill in the art to which this invention belongs. It should be further understood that terms such as those defined in commonly used dictionaries should be interpreted as having a meaning that is consistent with their meaning in the context of the relevant art and will not be interpreted in an idealized or overly formal sense unless expressly so defined herein.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A control circuit comprising:
   a first input-output pin configured to be coupled to a first input pin of a display device and a first sensing pin of a capacitive touch device;
   a second input-output pin configured to be coupled to a second input pin of the display device and a second sensing pin of the capacitive touch device;
   a sensing circuit determining whether the capacitive touch device is touched according to a voltage of the first input-output pin and a voltage of the second input-output pin; and
   a display controller providing a first driving signal to the display device via the first input-output pin and providing a second driving signal to the display device via the second input-output pin in a first display period and a second display period, wherein:
   after an end time point of the first display period, the display controller stops providing the first and second driving signals,
   after a start time point of the second display period, the display controller provides the first and second driving signals,
   from the end time point of the first display period to the start time point of the second display period, the sensing circuit detects the voltage level of the first input-output pin and stops detecting the voltage of the second input-output pin.

2. The control circuit as claimed in claim 1, wherein:
   in a third display period, the display controller provides the first driving signal to the display device via the first input-output pin and provides the second driving signal to the display device via the second input-output pin;
   after an end time point of the second display period, the display controller stops providing the first and second driving signals,
   after a start time point of the third display period, the display controller provides the first and second driving signals.

3. The control circuit as claimed in claim 2, wherein from the end time point of the second display period to the start time point of the third display period, the sensing circuit detects the voltage level of the second input-output pin and stops detecting the voltage of the first input-output pin.

4. The control circuit as claimed in claim 3, wherein from the end time point of the first display period to the start time point of the second display period, the voltage of the second input-output pin is equal to a floating level.

5. The control circuit as claimed in claim 4, wherein from the end time point of the second display period to the start time point of the third display period, the voltage of the first input-output pin is equal to the floating level.

6. The control circuit as claimed in claim 3, wherein from the end time point of the first display period to the start time point of the second display period, the voltage of the second input-output pin is equal to a first predetermined level.

7. The control circuit as claimed in claim 6, wherein from the end time point of the second display period to the start time point of the third display period, the voltage of the first input-output pin is equal to a second predetermined level, and the first predetermined level is opposite to the second predetermined level.

8. The control circuit as claimed in claim 2, wherein:
   from the end time point of the second display period to a middle time point, the sensing circuit detects the voltage level of the first input-output pin and stops detecting the voltage of the second input-output pin;
   from the middle lime point to the start time point of the third display period, the sensing circuit detects the voltage level of the second input-output pin and stops detecting the voltage of the first input-output pin, and
   the middle time point is between the end time point of the second display period and the start time point of the third display period.

9. The control circuit as claimed in claim 1, wherein from the end time point of the first display period to the start time point of the second display period, the sensing circuit provides a reference voltage to the first input-output pin and then detects the voltage level of the first input-output pin.

10. The control circuit as claimed in claim 9, wherein the reference voltage is one-third or one-quarter of a voltage of the first driving signal.

11. A display apparatus comprising:
a display device comprising a first input pin and a second input pin;
a capacitive touch device comprising a first sensing pin and a second sensing pin; and
a control circuit comprising:
a first input-output pin configured to be coupled to the first input pin and the first sensing pin;
a second input-output pin configured to be coupled to the second input pin and the second sensing pin;
a sensing circuit determining whether the capacitive touch device is touched according to a voltage of the first input-output pin and a voltage of the second input-output pin; and
a display controller providing a first driving signal to the display device via the first input-output pin and providing a second driving signal to the display device via the second input-output pin in a first display period and a second display period,
wherein:
the display device displays images according to the first and second driving signals in the first and second display periods,
after an end time point of the first display period, the display controller stops providing the first and second driving signals,
after a start time point of the second display period, the display controller provides the first and second driving signals,
from the end time point of the first display period to the start time point of the second display period, the sensing circuit detects the voltage level of the first input-output pin and stops detecting the voltage of the second input-output pin.

12. The display apparatus as claimed in claim 11, wherein the display device is a passive matrix display device.

13. The display apparatus as claimed in claim 11, wherein the display device is a passive matrix organic light-emitting diode display device which comprises a display area to display an image, and the display area comprises a plurality of light-emitting diodes, and one of the light-emitting diodes is directly connected between the first input pin and the second input pin.

14. The display apparatus as claimed in claim 11, wherein:
in a third display period, the display controller provides the first driving signal to the display device via the first input-output pin and provides the second driving signal to the display device via the second input-output pin;
after an end time point of the second display period, the display controller stops providing the first and second driving signals,
after a start time point of the third display period, the display controller provides the first and second driving signals.

15. The display apparatus as claimed in claim 14, wherein from the end time point of the second display period to the start time point of the third display period, the sensing circuit detects the voltage level of the second input-output pin and stops detecting the voltage of the first input-output pin.

16. The display apparatus as claimed in claim 15, wherein:
from the end time point of the first display period to the start time point of the second display period, the voltage of the second input-output pin is equal to a floating level, and
from the end time point of the second display period to the start time point of the third display period, the voltage of the first input-output pin is equal to the floating level.

17. The display apparatus as claimed in claim 15, wherein from the end time point of the first display period to the start time point of the second display period, the voltage of the second input-output pin is equal to a first predetermined level.

18. The display apparatus as claimed in claim 17, wherein from the end time point of the second display period to the start time point of the third display period, the voltage of the first input-output pin is equal to a second predetermined level, and the first predetermined level is opposite to the second predetermined level.

19. The display apparatus as claimed in claim 14, wherein:
from the end time point of the second display period to a middle time point, the sensing circuit detects the voltage level of the first input-output pin and stops detecting the voltage of the second input-output pin;
from the middle time point to the start time point of the third display period, the sensing circuit detects the voltage level of the second input-output pin and stops detecting the voltage of the first input-output pin, and
the middle time point is between the end time point of the second display period and the start time point of the third display period.

20. The display apparatus as claimed in claim 11, wherein from the end time point of the first display period to the start time point of the second display period, the sensing circuit provides a reference voltage to the first input-output pin and then detects the voltage level of the first input-output pin, and the reference voltage is one-third or one-quarter of a voltage of the first driving signal.

* * * * *